(12) United States Patent　　(10) Patent No.: US 8,374,784 B2
Mazlum et al.　　(45) Date of Patent: *Feb. 12, 2013

(54) SYSTEM AND METHOD FOR DETERMINING THE GEOGRAPHIC LOCATION OF A DEVICE

(75) Inventors: Selcuk Mazlum, Leesburg, VA (US); John Carlson, Dulles, VA (US); Martin Alles, Vienna, VA (US); George Maher, Herndon, VA (US)

(73) Assignee: Andrew LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/197,126

(22) Filed: Aug. 3, 2011

(65) Prior Publication Data

US 2011/0288771 A1　Nov. 24, 2011

Related U.S. Application Data

(63) Continuation of application No. 11/969,156, filed on Jan. 3, 2008, now Pat. No. 8,046,169.

(51) Int. Cl.
*G01C 21/00* (2006.01)

(52) U.S. Cl. ........ 701/469; 701/409; 701/412; 701/420; 701/447; 701/466; 701/468; 701/470; 701/472; 701/494; 701/501; 340/905; 340/988; 340/990; 340/992; 340/994; 455/456.1; 455/456.2; 455/456.3; 455/457; 180/65.21; 180/170; 348/118; 702/3

(58) Field of Classification Search ............... 701/93, 701/426, 455, 532, 22, 91, 117, 118, 119, 701/409, 412, 420, 447, 466, 468, 469, 470, 701/472, 494, 501, 533; 340/7.5, 446, 539.13, 340/357.75, 990, 995.16, 995.23, 995.26, 340/905, 988, 992, 994, 995, 995.19; 455/12.1, 455/67.7, 456.1, 456.2, 456.3, 457; 429/143, 429/147; 342/46, 357.21, 357.31, 357.23, 342/357.52, 457; 180/65.21, 170; 348/118; 702/3

See application file for complete search history.

(56) References Cited

U.S. PATENT DOCUMENTS

| | | | |
|---|---|---|---|
| 4,949,268 A * | 8/1990 | Nishikawa et al. | ........... 701/454 |
| 5,490,076 A * | 2/1996 | Rawicz et al. | ................. 455/98 |
| 5,576,973 A | 11/1996 | Haddy | |
| 5,628,050 A | 5/1997 | McGraw et al. | |
| 5,802,492 A | 9/1998 | DeLorme et al. | |
| 5,848,373 A | 12/1998 | Delorme et al. | |
| 6,097,709 A | 8/2000 | Kuwabara | |
| 6,108,558 A | 8/2000 | Vanderspool, II | |
| 6,115,605 A | 9/2000 | Siccardo et al. | |
| 6,269,246 B1 | 7/2001 | Rao et al. | |
| 6,281,834 B1 | 8/2001 | Stilp | |

(Continued)

OTHER PUBLICATIONS

Sönmez et al. Modeling and Simulation of a Terrain Aided Inertial Navigation Algorithm for Land Vehicles, 2008, IEEE, p. 1046-1052.*

(Continued)

*Primary Examiner* — McDieunel Marc
(74) *Attorney, Agent, or Firm* — Duane Morris LLP

(57) ABSTRACT

A method and apparatus for estimating a location of a device. For each of a plurality of locations of a device, a set of positional data is determined from signals received from a plurality of satellites. The positional data is filtered and compared with data from a road network database. This comparison may be a function of a distance from at least one point defined by a set of the filtered positional data to a road in the road network database and an angle between a line representing a best fit for plural points defined by corresponding plural sets of the filtered positional data to a line defined by a road in the road network database.

38 Claims, 15 Drawing Sheets

U.S. PATENT DOCUMENTS

| | | |
|---|---|---|
| 6,321,158 B1 | 11/2001 | DeLorme et al. |
| 6,393,294 B1 | 5/2002 | Perez-Breva et al. |
| 6,449,486 B1 | 9/2002 | Rao |
| 6,591,112 B1 | 7/2003 | Siccardo et al. |
| 6,782,265 B2 | 8/2004 | Perez-Breva et al. |
| 6,944,465 B2 | 9/2005 | Spain et al. |
| 7,116,987 B2 | 10/2006 | Spain, Jr. et al. |
| 7,167,714 B2 | 1/2007 | Dressler et al. |
| 7,233,799 B2 | 6/2007 | Spain, Jr. |
| 7,250,907 B2 | 7/2007 | Krumm et al. |
| 7,257,414 B2 | 8/2007 | Spain, Jr. et al. |
| 7,383,051 B2 | 6/2008 | Spain, Jr. et al. |
| 7,433,652 B2 | 10/2008 | Durgin |
| 7,433,695 B2 | 10/2008 | Gordon et al. |
| 7,460,505 B2 | 12/2008 | Spain |
| 7,725,111 B2 | 5/2010 | Dressler et al. |
| 7,734,298 B2 | 6/2010 | Bhattacharya et al. |
| 7,753,278 B2 | 7/2010 | Spain, Jr. et al. |
| 7,783,406 B2 | 8/2010 | Rothschild |
| 7,796,966 B2 | 9/2010 | Bhattacharya et al. |
| 7,848,762 B2 | 12/2010 | Gordon et al. |
| 7,899,467 B2 | 3/2011 | Feuerstein et al. |
| 8,013,785 B2 | 9/2011 | Bhattacharya et al. |
| 8,046,169 B2 * | 10/2011 | Mazlum et al. ............... 701/472 |
| 8,068,802 B2 | 11/2011 | Bhattacharya et al. |
| 8,068,855 B2 | 11/2011 | Dressler et al. |
| 8,106,817 B2 | 1/2012 | Bhattacharya et al. |
| 8,106,818 B2 | 1/2012 | Bhattacharya et al. |
| 8,155,394 B2 | 4/2012 | Allegra et al. |
| 2004/0203539 A1 | 10/2004 | Benes et al. |
| 2009/0177382 A1 | 7/2009 | Alles et al. |

OTHER PUBLICATIONS

Rick Roberts, "Project: IEEE P802.15 Working Group for Wireless Personal Area Networks (WPANS)," Harris Corporation, Melbourne Florida, Oct. 4, 2004, pp. 1-11.

Stephanie Bell, A Beginners Guide to Uncertainty of Measurement, The National Physics Laboratory of the United Kingdom of Great Britain and Northern Ireland, Teddington, Middlesex, UK, 2001, pp. 1-41.

* cited by examiner

SYSTEM AND METHOD FOR DETERMINING THE GEOGRAPHIC LOCATION OF A DEVICE

CROSS REFERENCE TO RELATED APPLICATIONS

The instant application claims the priority benefit of copending U.S. application Ser. No. 11/969,156 filed 3 Jan. 2008 entitled "System and Method for Determining the Geographic Location of a Device", the entirety of which is hereby incorporated herein by reference. The instant application is related to and hereby incorporates by reference in its entirety co-pending U.S. patent application Ser. No. 11/969,143 filed on 3 Jan. 2008.

BACKGROUND

It is important to determine the location of a mobile device capable of radio communication especially in an emergency situation. One method of assessing geolocation of a mobile device is utilizing the mobile device in conjunction with a geolocation system. Exemplary geolocation systems include satellite navigation systems. For example, one Global Navigation Satellite System (GNSS) is the NAVSTAR Global Positioning System (GPS). GPS is a radio positioning system providing subscribers with highly accurate position, velocity, and time (PVT) information.

FIG. 1 is a schematic representation of a constellation 100 of GPS satellites 101. With reference to FIG. 1, GPS includes a constellation of GPS satellites 101 in non-geosynchronous orbits around the earth. The GPS satellites 101 travel in six orbital planes 102 with four of the GPS satellites 101 in each plane. Of course, a multitude of on-orbit spare satellites may also exist. Each orbital plane has an inclination of 55 degrees relative to the equator. In addition, each orbital plane has an altitude of approximately 20,200 km (10,900 miles). The time required to travel the entire orbit is just under 12 hours. Thus, at any given location on the surface of the earth with clear view of the sky, at least five GPS satellites are visible at any given time.

With GPS, signals from the satellites arrive at a GPS receiver and are utilized to determine the position of the receiver. GPS position determination is made based on the time of arrival (TOA) of various satellite signals. Each of the orbiting GPS satellites 101 broadcasts spread spectrum microwave signals encoded with satellite ephemeris information and other information that allows a position to be calculated by the receiver. Presently, two types of GPS measurements corresponding to each correlator channel with a locked GPS satellite signal are available for GPS receivers. The two carrier signals, L1 and L2, possess frequencies of 1.5754 GHz and 1.2276 GHz, or wavelengths of 0.1903 m and 0.2442 in, respectively. The L1 frequency carries the navigation data as well as the standard positioning code, while the L2 frequency carries the P code and is used for precision positioning code for military applications. The signals are modulated using bi-phase shift keying techniques. The signals are broadcast at precisely known times and at precisely known intervals and each signal is encoded with its precise transmission time.

GPS receivers measure and analyze signals from the satellites, and estimate the corresponding coordinates of the receiver position, as well as the instantaneous receiver clock bias. GPS receivers may also measure the velocity of the receiver. The quality of these estimates depends upon the number and the geometry of satellites in view, measurement error and residual biases. Residual biases include satellite ephemeris bias, satellite and receiver clock errors and ionospheric and tropospheric delays. If receiver clocks were perfectly synchronized with the satellite clocks, only three range measurements would be needed to allow a user to compute a three-dimensional position. This process is known as multi-lateration. However, given the expense of providing a receiver clock whose time is exactly synchronized, conventional systems account for the amount by which the receiver clock time differs from the satellite clock time when computing a user's position. This clock bias is determined by computing a measurement from a fourth satellite using a processor in the receiver that correlates the ranges measured from each satellite. This process requires four or more satellites from which four or more measurements can be obtained to estimate four unknowns x, y, z, b. The unknowns are latitude, longitude, altitude, and receiver clock offset. The amount b, by which the processor has added or subtracted time, is the instantaneous bias between the receiver clock and the satellite clock.

However, the signal received from each of the visible satellites does not necessarily result in an accurate position estimation. The quality of a position estimate largely depends upon two factors: satellite geometry, particularly, the number of satellites in view and their spatial distribution relative to the user, and the quality of the measurements obtained from satellite signals. For example, the larger the number of satellites in view and the greater the distances between them, the better the geometry of the satellite constellation. Further, the quality of measurements may be affected by errors in the predicted ephemeris of the satellites, instabilities in the satellite and receiver clocks, ionospheric and tropospheric propagation delays, multipath, receiver noise and RF interference. With standalone GPS navigation or geographic location in a communication system adaptable to utilize GPS data, where a user with a GPS receiver obtains code-phase ranges with respect to a plurality of satellites in view, without consulting with any reference station, the user is very limited in ways to reduce the errors or noises in the ranges.

In addition to using GPS signals to determine a position estimate, a mobile location device may have several other sources of information that can work independently or in association with the GPS information to determine a position estimate. For example, the location device may be capable of calculating the Round Trip Time (RTT) from the device to some known location. Additionally, a network element, e.g., such as a base station, may compute the RTT and convey this information to the device. Network receivers with known locations may compute the Time Difference of Arrival (TDOA) of a signal transmitted from the device; this TDOA information may then be conveyed back to the device. A network element may compute an Angle of Arrival (AOA) with respect to the transmissions of the device and convey this information to the location device as well. The device may also be capable of receiving other signals present in the environment from transmitters with known positions such as TV transmissions, cellular transmissions etc., from which other measurements dependent on the location of the device can be obtained. The location device may make measurements on the various transmission of network elements and these Network Measurement Reports (NMRs) for that device can also be used, in association with a calibration database, to estimate the position of the device. A variety of sources may thus be combined at the device in computing the position estimate. Combined source location estimates are termed hybrid locations for the purpose of this application.

Several methods of GPS navigation and mobile device positioning are widely utilized whereby the current position and travel path of a mobile device may be indicated, measured, displayed, and/or superimposed upon a road map of the region in which the mobile device is currently traveling or located. With such an apparatus and/or associated geolocation system it is essential to determine the current position of a mobile device as accurately as possible under various environmental conditions. One typical prior art method produces an output signal from a gyroscope, indicative of changes in the mobile device course direction (i.e., detected as an amount of rotation of the device about a predetermined axis of the gyroscope) was used, with each such change representing a change in the travel direction of the device in relation to a previously determined absolute travel direction. The direction change information from the gyroscope is used in conjunction with distance information to express a distance that has been traveled by the device relative to some preceding estimated position thereof, i.e., distance information obtained based on an output signal from a device speed sensor, to perform dead reckoning (DR) calculations thereby obtaining the estimated current position and travel direction of the device. When a gyroscope is utilized to measure changes in the travel direction of a mobile device, measurements are generally based upon detecting values of angular velocity of rotation about the aforementioned predetermined axis of the gyroscope. When that axis does not correspond to the axis about which the mobile device actually rotates when performing a turn, then the conversion gain of the gyroscope (which is a proportionality constant, predetermined beforehand as a conversion factor for conversion to angular velocity) may differ from the correct conversion factor thereby resulting in a conversion gain error. Furthermore, as a result of differences between output voltages due to variations in detected angular velocity, drift errors may also arise. These errors may adversely affect the current position and/or direction of travel of the respective mobile device.

Wireless signals are generally subject to distortions due to multipath and noise. These disturbances often have a significant detrimental impact on the accuracy of position estimation. Sources of positional information such as RTT, TA, TDOA, AOA, NMR and GPS information may be corrupted to varying degrees by these natural sources of error.

Because of the sources of inaccuracies described above, methods of mobile device position detection are also utilized in the prior art whereby position measurement data conveyed by radio waves transmitted from a source such as a positional satellite are used to periodically obtain absolute position and travel direction data. This data may be employed to correct the positions and directions derived by dead reckoning based on the on-board sensor outputs as described above. However, with any positioning system, the absolute position and direction estimates obtained may contain substantial amounts of randomly varying error as described above. For this reason, position and travel direction information derived from positional data (whether GPS positional data or another type of positional data, or a combination of both such as in hybrid schemes) are generally subjected to a form of filter processing to reduce the effects of the random errors in the data. The filtered result may then be applied to correct the estimated positions and travel directions derived by dead reckoning. A commonly utilized form of such processing is the Kalman filter.

In the prior art, successive sets of corrected mobile device position and travel direction estimates may be combined to obtain an estimate of the path traveled by the mobile device up to a current position. Periodically, the estimated travel path may be applied in map matching processing, i.e., the path is compared with data expressing a road map of a region in which the device is currently traveling or located, to make use of the fact that the device location is generally constrained to streets or freeways, etc. This may further increase the accuracy of a finally estimated current position of the device. In this prior art method, it becomes possible to accurately obtain and display the route traversed by the mobile device and the device's current position. Under normal conditions, such an apparatus may provide accurate results. However substantial amounts of error may arise in the estimated travel direction and position of the device derived by a prior art apparatus in several scenarios. For example, when the mobile device is currently located in an area in which it is difficult or impossible to receive GPS radio waves, e.g., multistory or underground parking lot, tunnel, dense urban environment, etc., or when the mobile device is inoperative and power is initially applied thereto, then the estimated mobile device location and direction may contain a large amount of error. In such conditions, even if acquisition of GPS or other position measurement data is possible, it may not be possible to apply appropriate map matching processing to the results; therefore, the GPS or other position measurement data cannot be used to accurately correct the error which arises in the estimated travel direction and position.

Accordingly, there is a need in the art for map matching for ground truth correction that would overcome the deficiencies of the prior art. The deficiencies of the prior art may be alleviated through the embodiments and techniques described herein that correct estimated positions of the device utilizing a knowledge of the underlying road vector coordinates and identifying and correcting areas of bad acquired positional data through novel methods and apparatus.

Therefore, an embodiment of the present subject matter provides a method for estimating a location of a device. The method comprises the steps of determining for each of a plurality of locations of the device a set of positional data from signals received from a plurality of satellites and filtering the positional data. The method further comprises the step of comparing the filtered positional data with data from a road network database where the comparing is a function of a distance from at least one point defined by a set of the filtered positional data to a road in the road network database and an angle between a line representing a best fit for plural points defined by corresponding plural sets of the filtered positional data to a line defined by a road in the road network database. Another embodiment of the present subject matter may further comprise the step of filtering the compared data as a function of topographical information. A further embodiment of the present subject matter may comprise the step of correcting the compared data by projecting an estimated location on a predetermined road. Yet another embodiment of the present subject matter may comprise the step of correcting the compared data as a function of topographical information.

An additional embodiment of the present subject matter provides a novel device comprising a receiver for receiving signals from a plurality of satellites and circuitry for determining for each of a plurality of locations of the device a set of positional data from the received signals. The device further comprises a filter for filtering the positional data and circuitry for comparing the filtered positional data with data from a road network database to provide an estimated location of the device. The comparison may be a function of a distance from at least one point defined by a set of the filtered positional data to a road in the road network database and an angle between a line representing a best fit for plural points defined by corresponding plural sets of the filtered positional data to a line defined by a road in the road network database.

A further embodiment of the present subject matter provides a system for estimating the location of a mobile station that receives signals from a plurality of sources. The system comprises a receiver for receiving signals from a plurality of transmission sources and circuitry for determining for each of a plurality of locations of mobile station a set of positional data from the received signals. The system further comprises a filter for filtering the positional data and circuitry for comparing the filtered positional data with data from a road network database to provide as estimated location of the mobile station. The comparison may be a function of a distance from at least one point defined by a set of the filtered positional data to a road in the road network database and an angle between a line representing a best fit for plural points defined by corresponding plural sets of the filtered positional data to a line defined by a road in the road network database.

These embodiments and many other objects and advantages thereof will be readily apparent to one skilled in the art to which the invention pertains from a perusal of the claims, the appended drawings, and the following detailed description of the embodiments.

DETAILED DESCRIPTION

Figure 1:
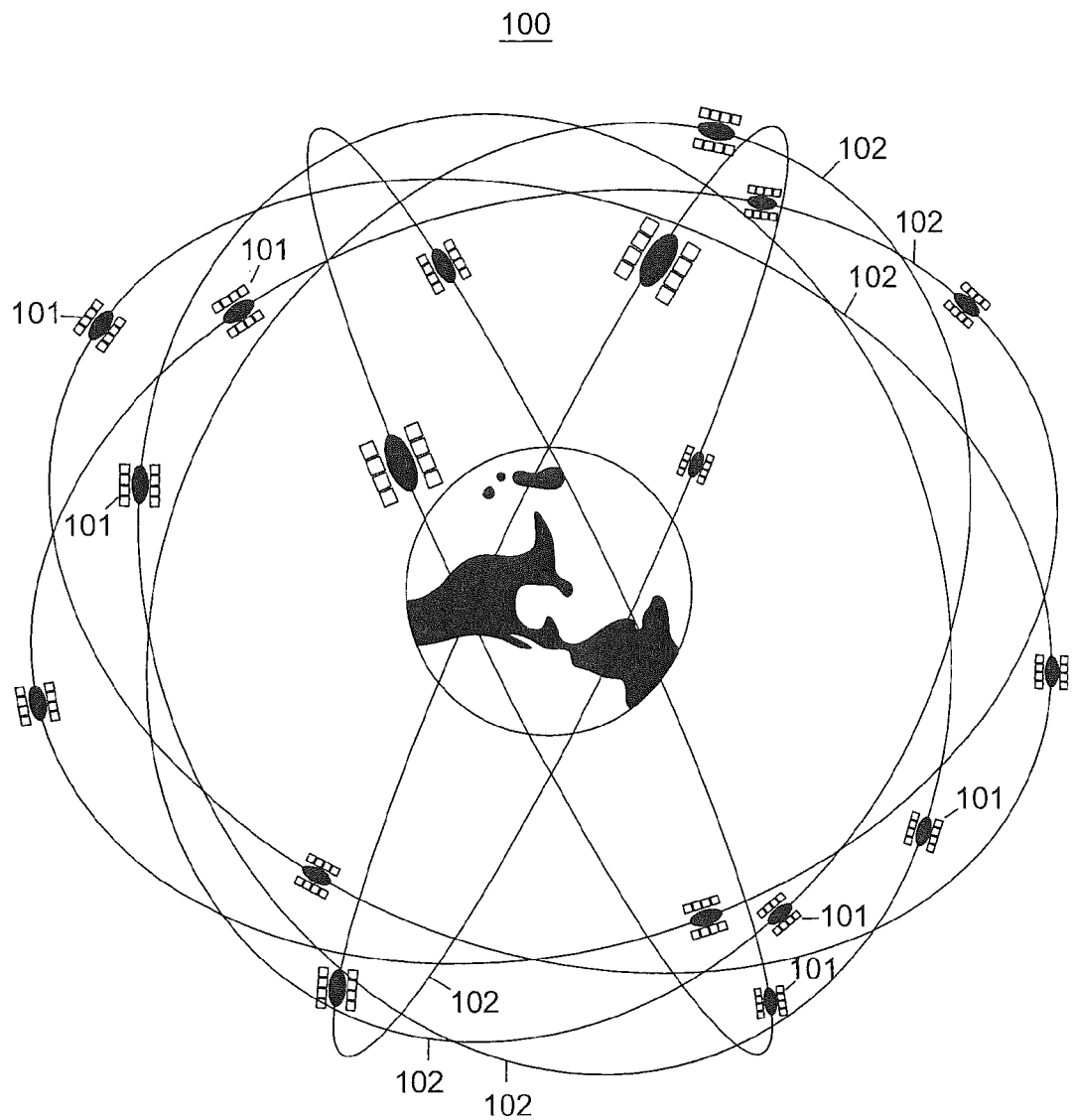
FIG. 1 is a schematic representation of a constellation of GPS satellites.

With reference to the figures where like elements have been given like numerical designations to facilitate an understanding of the present subject matter, the various embodiments of a system and method for determining the geographic location of a device are herein described.

The disclosure relates to methods and apparatuses for determining the geographic location of a device using position related information (positional information) derived from satellites or other sources and calibration of a device or system. The satellites may be considered as part of a Global Navigation Satellite System ("GNSS"), such as, for example, the U.S. Global Positioning System ("GPS"). While the following description references the GPS system, this in no way should be interpreted as limiting the scope of the claims appended herewith. As is known to those of skill in the art, other GNSS systems operate, for the purposes of this disclosure, similarly to the GPS system, such as, but not limited to, the European Satellite project, Galileo, the Russian satellite navigation system, GLONASS, the Japanese Quasi-Zenith Satellite System ("QZSS"), and the Chinese satellite navigation and positioning system called Beidou. Therefore, references in the disclosure to GPS and/or GNSS, where applicable, as known to those of skill in the art, apply to the above-listed GNSS systems as well as other GNSS systems not listed above.

The terms "device", "handset" and "station" may be utilized interchangeably through the present disclosure and such use is not intended to limit the scope of the claims appended herewith. Further the terms "data", "information", "point(s)", and/or "fix(es)" may be utilized interchangeably through the present disclosure and such use is not intended to limit the scope of the claims appended herewith.

The following description of the present subject matter is provided as an enabling teaching of the present subject matter and its best, currently-known embodiment. Those skilled in the art will recognize that many changes can be made to the embodiments described herein while still obtaining the beneficial results of the present subject matter. It will also be apparent that some of the desired benefits of the present subject matter can be obtained by selecting some of the features of the present subject matter without utilizing other features. Accordingly, those who work in the art will recognize that many modifications and adaptations of the present subject matter are possible and may even be desirable in certain circumstances and are part of the present subject matter. Thus, the following description is provided as illustrative of the principles of the present subject matter and not in limitation thereof. While the following exemplary discussion of embodiments of the present subject matter may be directed primarily towards GPS data, it is to be understood that the discussion is not intended to limit the scope of the present subject matter in any way and that the principles presented are equally applicable to other types of geolocation data, e.g., signal strength, NMR, Cell-ID, TDOA, RTT, TA, AOA, etc., capable of being delivered by other components in a communications network such as a base station, location measurement unit, other mobile devices, etc. In addition, the use of various combinations of all of these sources, as in a hybrid location scheme, is within the scope of the subject matter disclosed herein.

Those skilled in the art will appreciate that many modifications to the exemplary embodiments described herein are possible without departing from the spirit and scope of the present subject matter. Thus, the above description is not intended and should not be construed to be limited to the examples given but should be granted the full breadth of protection afforded by the appended claims and equivalents thereto. In addition, it is possible to use some of the features of the present subject matter without the corresponding use of the other features. Accordingly, the foregoing description of exemplary or illustrative embodiments is provided for the purpose of illustrating the principles of the present subject matter and should not limit the scope of the claims appended herewith. It is thus an aspect of an embodiment of the present subject matter to determine the actual location of a mobile device using an erroneous location computed by a GPS receiver, or a combined source receiver, given that the mobile device is on a road at any given time. It should be noted that a road refers to a common instance of a set of possible candidate locations. Therefore, a road may be interpreted as or defined by any set of constraints on the possible locations of a mobile device. It is also an aspect of an embodiment of the present subject matter to utilize current and past erroneous position estimates from arbitrary sources, their respective time stamps, other GPS information such as number of visible satellites, HDOP, and/or GPS mode along with road network data to determine the actual location of a mobile device. It is also an aspect of an embodiment of the present subject matter to improve the accuracy of a navigation system by means of an evolutionary algorithm that compares data mappings (positional information and related locations) that occur when the navigation system is placed in use.

Figure 2:
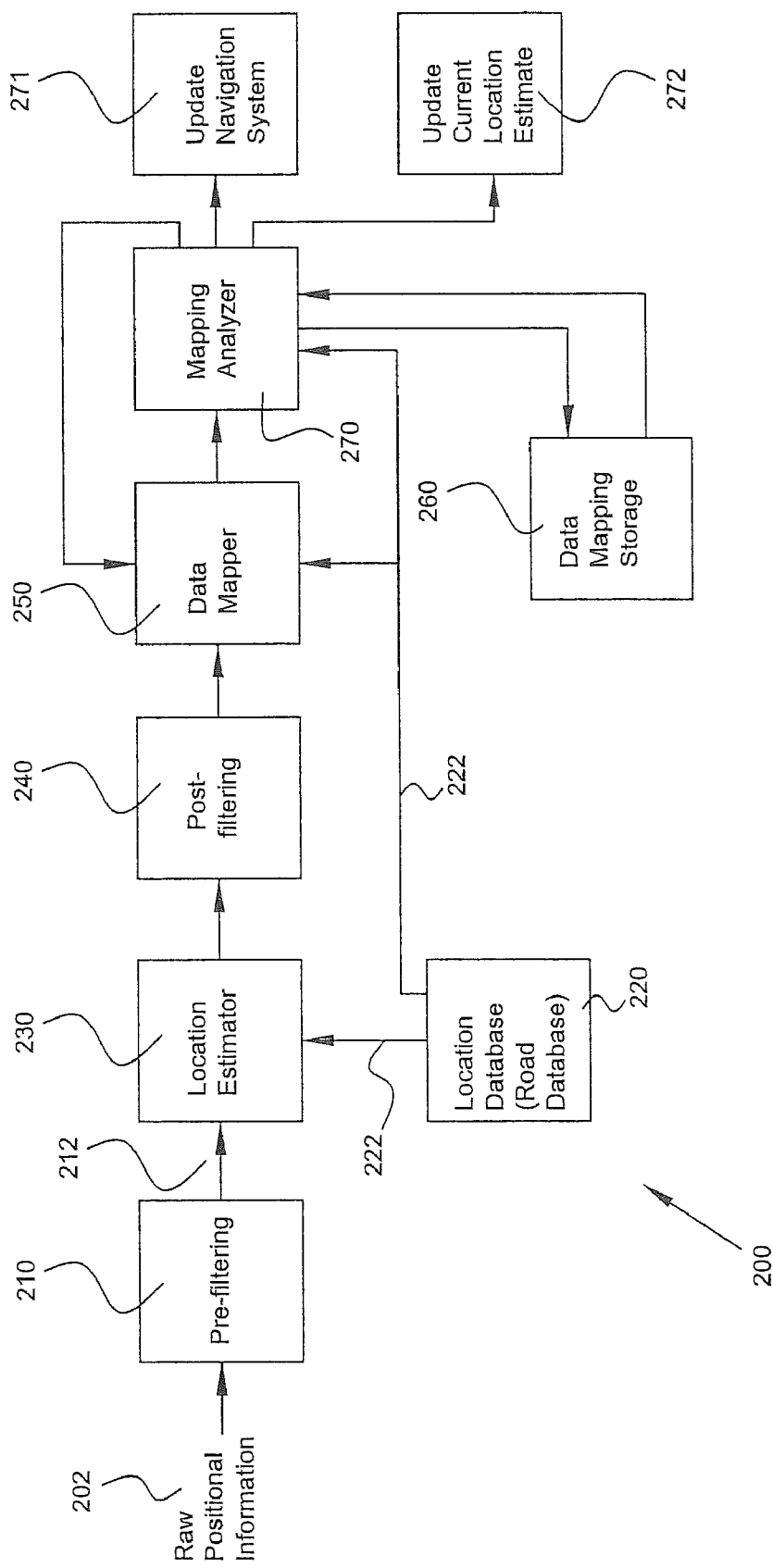
FIG. 2 is a block diagram of a navigational unit according to an embodiment of the present subject matter.

FIG. 2 is a block diagram of a navigational unit according to an embodiment of the present subject matter. With reference to FIG. 2, a navigational unit 200 may comprise a plurality of separate components or units such as a pre-filtering unit 210, a road network database 220, a location estimator unit 230, a post-filtering unit 240 and/or a data mapper unit 250, and/or a data mapping storage unit 260, and/or a mapping analyzer unit 270. An exemplary navigational unit 200 may be a part of any communications system, geolocation system, navigational system or even a hand-held navigational apparatus that may require accurate positioning. Such a system may also be a real-time positioning system such as a car navigation system or a traffic monitoring system. Exemplary navigational units 200 may also be employed in an offline system that conducts post processing of previously recorded positional information, e.g., GPS fixes.

The navigational unit 200 accepts raw positional data 202 which may include any data that a receiver, such as for example a GPS receiver (not shown), provides. Some of the fields contained in GPS data may be, but are not limited to, latitude, longitude, time of fix, number of visible GPS satellites, horizontal dilution of precision (HDOP), altitude, GPS mode (i.e., GPS, Differential-GPS, Dead Reckoning), etc. In addition, the receiver may obtain any of Timing Advance (TA), Round Trip Time (RTT), Time Difference of Arrival (TDOA), Angle of Arrival (AOA), Network Measurement Reports (NMRs) or any other form of information that is location dependent (i.e., any positional information). Depending upon the receiver utilized with embodiments of the present subject matter and its capability of communicating with other network devices, some of this data may or may not be available.

The road network database 220 may include information about roads in specific regions. Some of this information may comprise accurate latitudes and longitudes of roads, topographical information, acceptable or permissible direction of travel (i.e., one-way roads, two-way roads, etc.), whether a turn is allowed from one road to another, speed limits on a road or portions thereof, etc. A road in an exemplary database 220 may be defined by, but is not limited to, a set of latitudes and longitudes. In another embodiment of the present subject matter, a road in an exemplary database may be defined by a set of constraints on plural pairs or a set of latitudes and longitudes. For example, the number of latitude and longitude pairs may depend upon the curvature of the respective road and any accuracy required for that road or the respective region. For a given set of raw positional data 202, the road network database 220 may create road network data 222 that includes, for example, all possible roads around the raw GPS data 202. The road network data 222 may be provided as an input to the location estimator unit 230, data mapper unit 250 and mapping analyzer unit 270.

The pre-filtering unit 210 receives raw positional data 202, verifies the integrity of the positional data 202, corrects positional data 202, and discards any suspicious positional data 202. An exemplary pre-filtering unit 210 may comprise a plurality of filters and any one filter or combination thereof may be utilized in filtering the positional data 202. Further, any one or combination of filters may be switched on or off either by the system based upon default values, predetermined thresholds, topographical inputs or by a user of a respective apparatus employing an embodiment of the present subject matter. One exemplary filter may filter invalid location points or fixes. For example, a receiver may return an invalid location fix if the quality of the computed fix is low. Further, when an embodiment of the present subject matter is traveling through an environment having poor satellite visibility, poor reception of other signals from network elements or poor communication with such network elements, some valid fixes may be detected between these invalid fixes. However, these valid fixes may possess a large error due to the short time of satellite or network element visibility. The filter may detect and discard these invalid and/or erroneous fixes. Further, if the current fix is invalid then a predetermined number of fixes before and after the current fix may also be discarded. Exemplary predetermined numbers or thresholds are configurable and may be a function of the terrain type and how often positional data is received.

Another exemplary filter in the pre-filtering unit 210 may be an HDOP filter. As is known in the art, HDOP allows one to more precisely estimate the accuracy of horizontal (i.e., latitude, longitude) position fixes or points by adjusting error estimates according to the geometry of the utilized or visible satellites and other network elements such as Base Stations (BSs), transmission towers, etc. Therefore, if HDOP is provided by the receiver, the HDOP filter may verify if the HDOP values are less than a predetermined threshold. Therefore, fixes having HDOP values higher than the predetermined threshold will be discarded.

Figure 3:
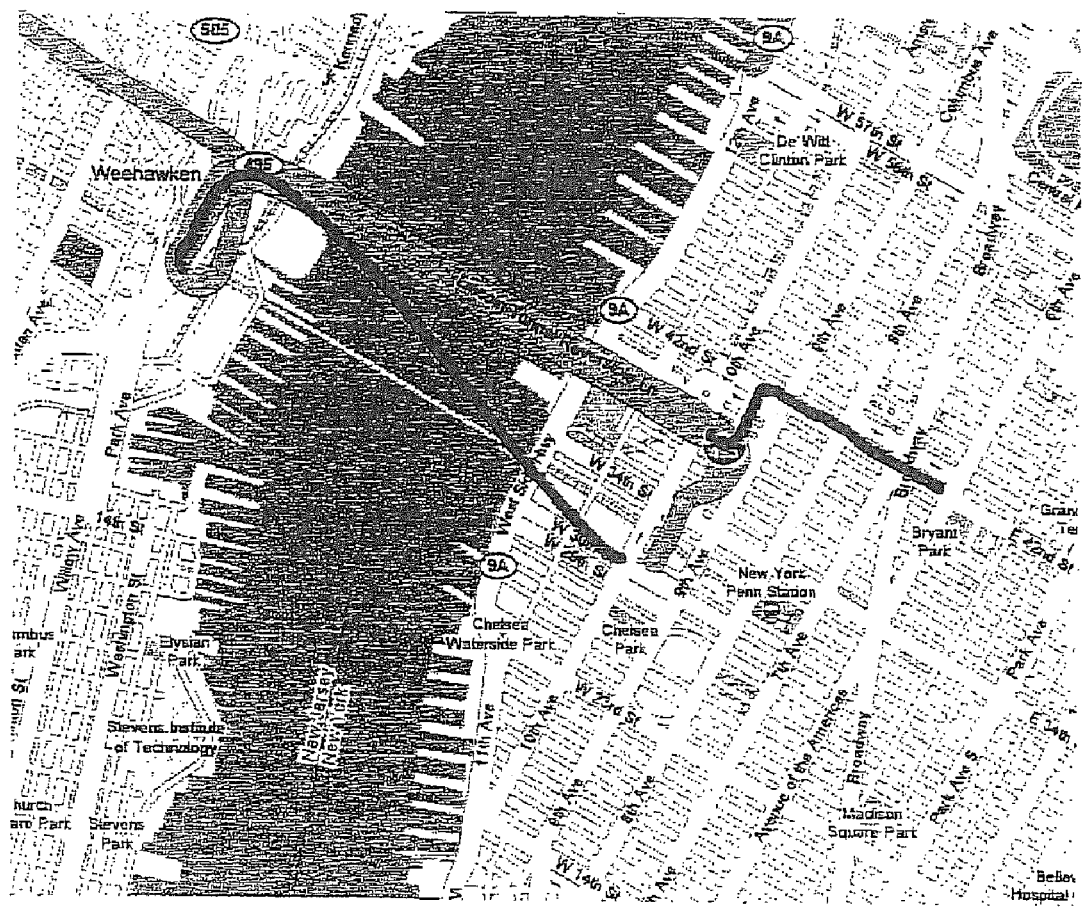
FIG. 3 is a depiction of positioning error in a dead reckoning mode.

Yet another exemplary filter in the pre-filtering unit may 210 be a dead reckoning (DR) filter. If the respective receiver is provided with a dead reckoning system and may report the DR mode as GPS data, then such a filter may be utilized. By way of example, when the DR mode is utilized for an extended period of time such as when traveling in a long tunnel, an error may accumulate and an estimated location for a mobile device may drift greatly from the actual location. FIG. 3 is a depiction of positioning error in a dead reckoning mode. Thus, an exemplary DR filter may discard DR fixes if the respective receiver stays on DR mode for greater than a predetermined threshold. This threshold may be a default threshold or may be input by a user.

Figure 4:
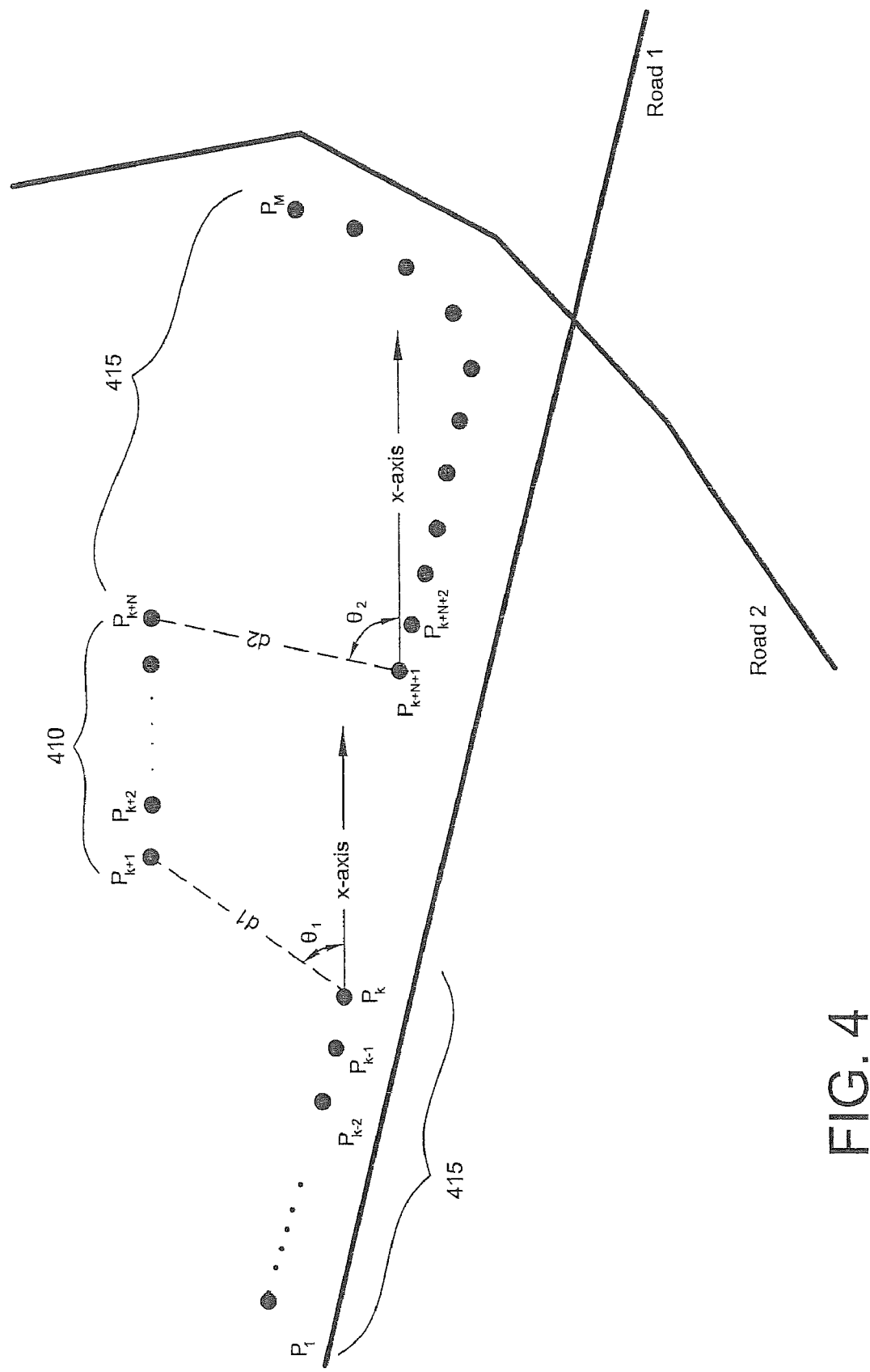
FIG. 4 is a depiction of a shift in plotted GPS points.

Embodiments of the present subject matter may also employ a filter in the pre-filtering unit 210 that filters jumps or shifts in positional data. An exemplary filter detects a jump or shift and ascertains whether the shift(s) is correctable. If the shift is correctable then the filter corrects the shift; however, if the shift cannot be corrected, then the filter discards these points. For example, in dense urban environments, due to sudden changes in the environment, the fixes may be shifted. If all fixes are plotted, including these shifted fixes, a broken segment of points may result as shown in FIG. 4. FIG. 4 is a depiction of a shift in plotted GPS points. With reference to FIG. 4, M points are received and N points ($P_{k+1}$ to $P_{k+N}$) 410 are shifted from the other received points 415. The distance between points $P_k$ and $P_{k+1}$, i.e., the beginning of the shift, is represented as d1, and the distance between points $P_{k+N}$ and $P_{k+N+1}$, i.e., the end of the shift, is represented as d2. The corresponding time difference between points $P_k$ and $P_{k+1}$ is t1, and the corresponding time difference between points $P_{k+N}$ and $P_{k+N+1}$ is t2. In the case exemplified in FIG. 4, the respective receiver reported data periodically such that t1=t2. Therefore, the speeds between points $P_k$ and $P_{k+1}$ and points $P_{k+N}$ and $P_{k+N+1}$ are s1=d1/t1 and s2=d2/t2, respectively. The corresponding shift angles with respect to the x axis, are θ1 and θ2, respectively.

An exemplary filter may detect a shift between two consecutive points if the speed between the two consecutive points exceeds a predetermined threshold. This threshold may be a default threshold or may be input by a user. With reference to the example illustrated in FIG. 4, if s1>MAX SPEED then a shift would be detected between GPS points $P_k$ and $P_{k+1}$. The variable or threshold of MAX SPEED may be configurable and may be a function of the terrain, other topographical inputs and/or speed limits of roads. Once the filter has identified the shifts in a set of positional data, then the filter determines whether any of the identified shifts are correctable. For example, if the speeds and angles between two consecutive shifts, e.g., $P_k$ and $P_{k+1}$, and $P_{k+N}$ and $P_{k+N+1}$ are close enough then the respective points between these shifts, $P_{k+1}$ to $P_{k+N}$, may be corrected. The following relationship may be utilized by an exemplary filter to determine whether a set of GPS points, $P_{k+1}$ to $P_{k+N}$, may be corrected:

$$\text{if abs}((s2-s1)/(s2+s1))<\text{SPEED\_THRESHOLD AND} \\ \text{abs}((\theta2-\theta1)/(\theta2+\theta1))<\text{ANGLE\_THRESHOLD} \\ \text{then the shift is correctable.} \quad (1)$$

It should be noted that the relationships provided above and all relationships subsequent hereto are exemplary only and should not in any way be construed as limiting the scope of the claims appended herewith. If, however, the set of points, $P_{k+1}$ to $P_{k+N}$, do not meet the criteria established by equation (1), then the points may be discarded. The speed and angle thresholds identified in equation (1) may be configurable and may be a function of the terrain, other topographical inputs, speed limits of roads, etc.

Once the filter has determined that a shift or plural shifts meet the criteria for correction, then the filter may move or correct the points between the points, $P_{k+1}$ to $P_{k+N}$, so that points $P_k$ and $P_{k+N+1}$ are connected smoothly. The following relationships may be utilized to correct applicable shifts:

$$\text{angle\_step}=(\theta2-\theta1)/(N-1) \quad (2)$$

$$\text{speed\_step}=(s2-s1)/(N-1) \quad (3)$$

Let $P_{k+1+T}$ be a point between $P_{k+1}$ to $P_{k+N}$, therefore T=0 . . . N−1. The correction angle and correction speed for this point may be defined as:

$$\text{angle\_}T=\theta1+\text{angle\_step}*T \quad (4)$$

$$\text{speed\_}T=s1+\text{speed\_step}*T \quad (5)$$

The correction vector for this point may be defined as:

$$\text{vector\_}T=\text{speed\_}T*\cos(\text{angle\_}T)*x+\text{speed\_}T*\sin(\text{angle\_}T)*y \quad (6)$$

where cos( ) and sin( ) are cosine and sine functions, respectively, and x and y are unit vectors along the x and y axis. The vector represented as vector_T is a representation of the distance and direction point $P_{k+1+T}$ will be shifted. The shifting may be conducted by adding this representative vector's x and y components to the respective point's coordinates and may be conducted for any one, combination of, or all of the points between $P_{k+1}$ to $P_{k+N}$.

Figure 5:
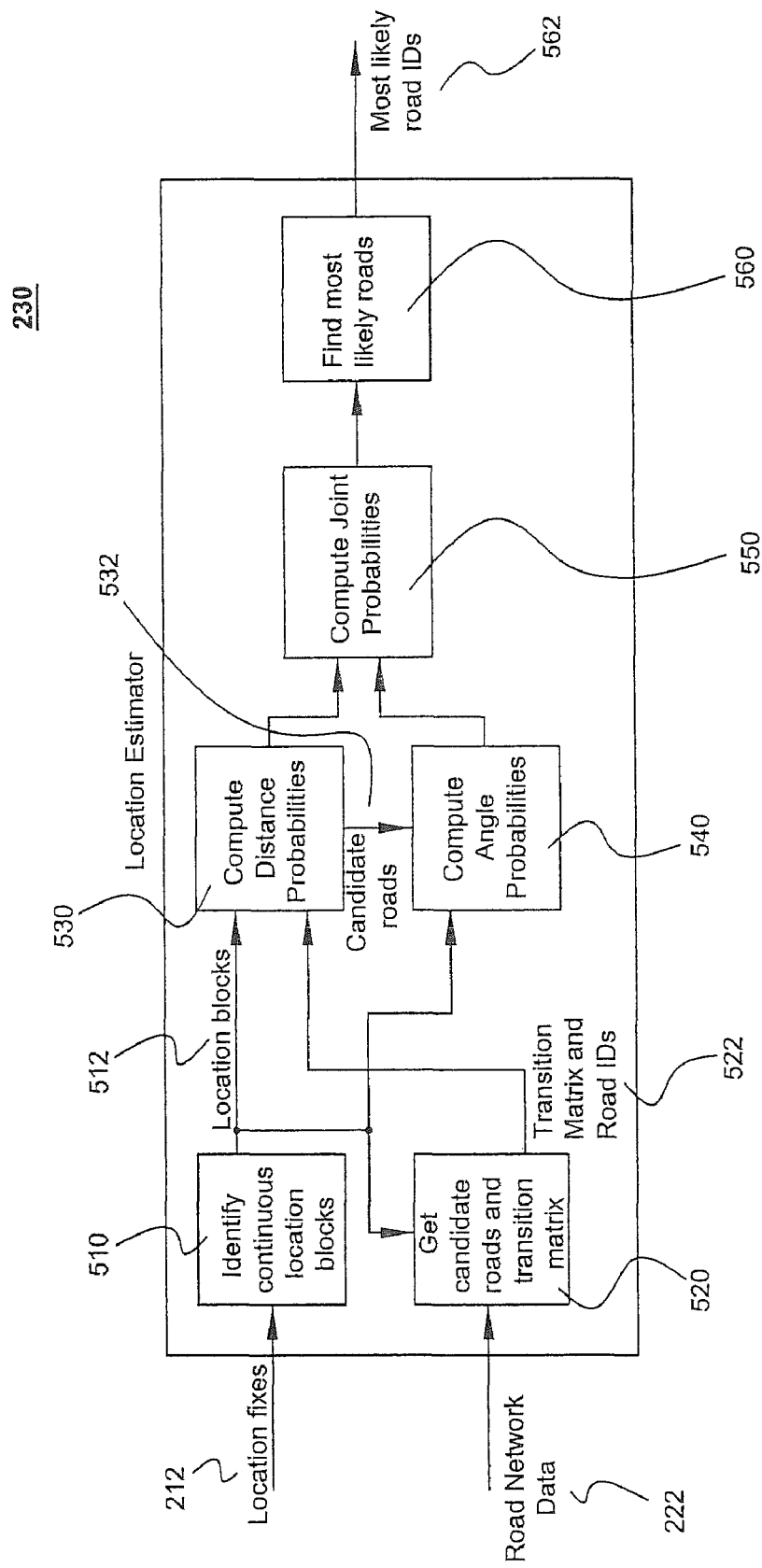
FIG. 5 is a block diagram of a location estimator unit according to an embodiment of the present subject matter.

A location estimator unit 230 according to an embodiment of the present subject matter may receive filtered data 212 from the pre-filtering unit 210 such as filtered latitude, longitude pairs and road network data 222 from the road network database 220 and estimate the most likely location (e.g., road and position on such road) for each fix. Estimation may be conducted utilizing a joint probability of distance to a road and angle between a road and the direction of travel. Distance to a road and angle between a road and the direction of travel for a fix may be assumed to be two independent random variables. FIG. 5 is a block diagram of a location estimator unit according to an embodiment of the present subject matter. With reference to FIG. 5, an exemplary location estimator unit 230 may identify continuous location blocks 510. A continuous location block may generally be representative of consecutive fixes, points or data in which the time between each fix is small enough such that the mobile device having the respective GPS receiver will not travel a large distance between consecutive fixes. Such an assumption may be made to ensure that the mobile device does not move from one road to another unconnected road. It should be noted that pre-filtering and/or the receiver itself may cause some invalid fixes. If the number of consecutive invalid fixes is too large then this may result in a discontinuity in valid fixes. The location estimator unit 230, however, may identify any continuous blocks of fixes and operate an appropriate algorithm independently for these blocks.

Figure 6:
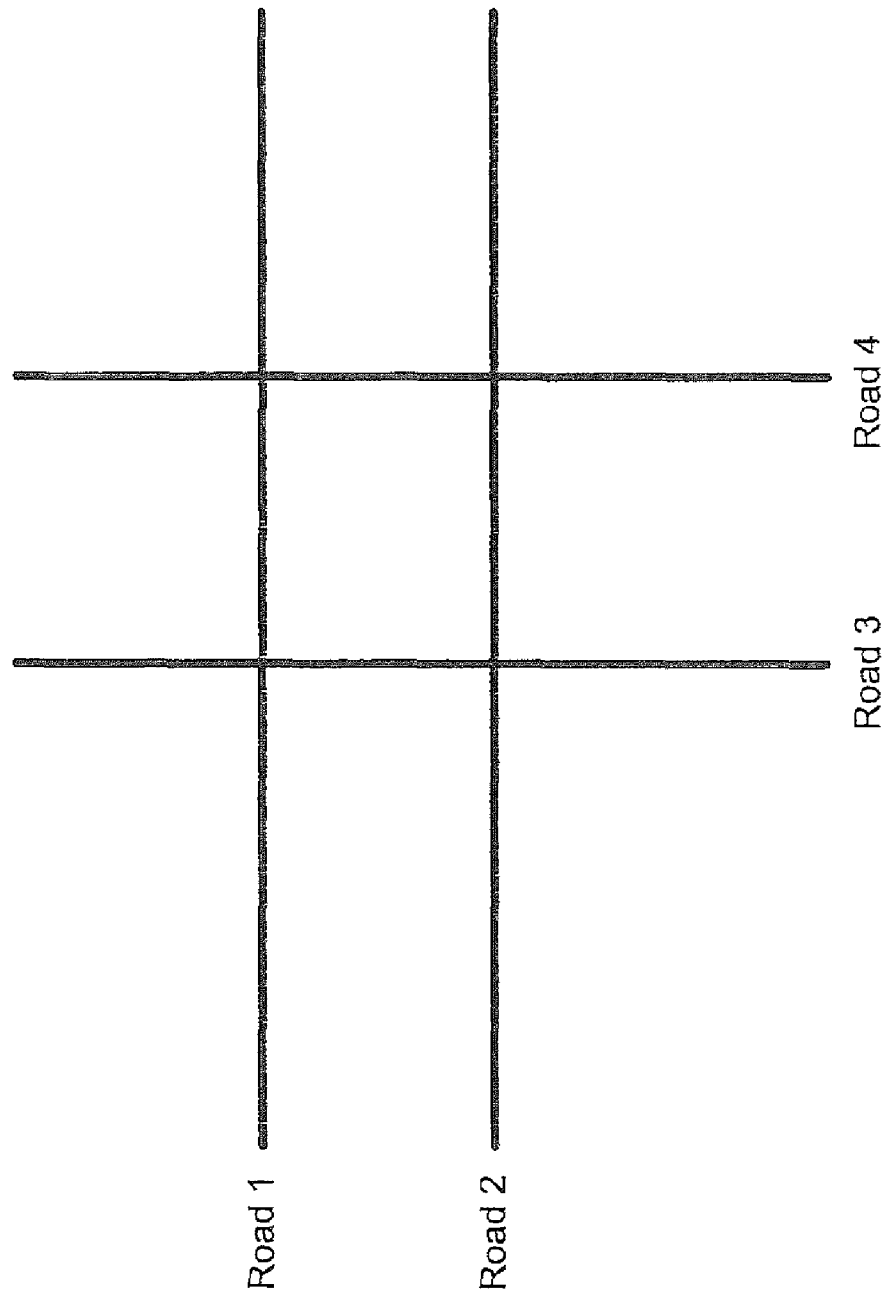
FIG. 6 is an illustration of candidate roads for an exemplary transition matrix according to an embodiment of the present subject matter.

The location estimator unit 230 may also identify candidate roads to reduce the computational burden on an appropriate algorithm as depicted in block 520. For example, assuming M fixes in a continuous block, the location estimator unit 230 may divide the continuous block into sub-blocks each having N fixes but the last block. The last block may have (M mod N) fixes. The location estimator unit 230 may then determine each sub-block's average latitude and longitude. Roads within a predetermined distance, e.g., CAND_DIST meters, may be considered as candidate roads. Candidate roads for the sub-blocks may then be combined and each provided with a unique road identification ("ID"). An exemplary algorithm may then utilize these road IDs and determine a transition matrix. Candidate roads for an exemplary transition matrix according to an embodiment of the present subject matter is depicted in FIG. 6. With reference to FIG. 6, the transition matrix may specify whether a vehicle may travel from one road to another. That is, if road k intersects with road p then T(k,p)=1. However, if road k fails to intersect with road p, then T(k,p)=0. T(k,k) and T(p,p) are, of course, set to 1. It follows that the transition matrix T for the candidate roads shown in FIG. 6 may be represented by the following matrix relationship:

$$T = \begin{bmatrix} 1 & 0 & 1 & 1 \\ 0 & 1 & 1 & 1 \\ 1 & 1 & 1 & 0 \\ 1 & 1 & 0 & 1 \end{bmatrix} \quad (7)$$

Figure 7:
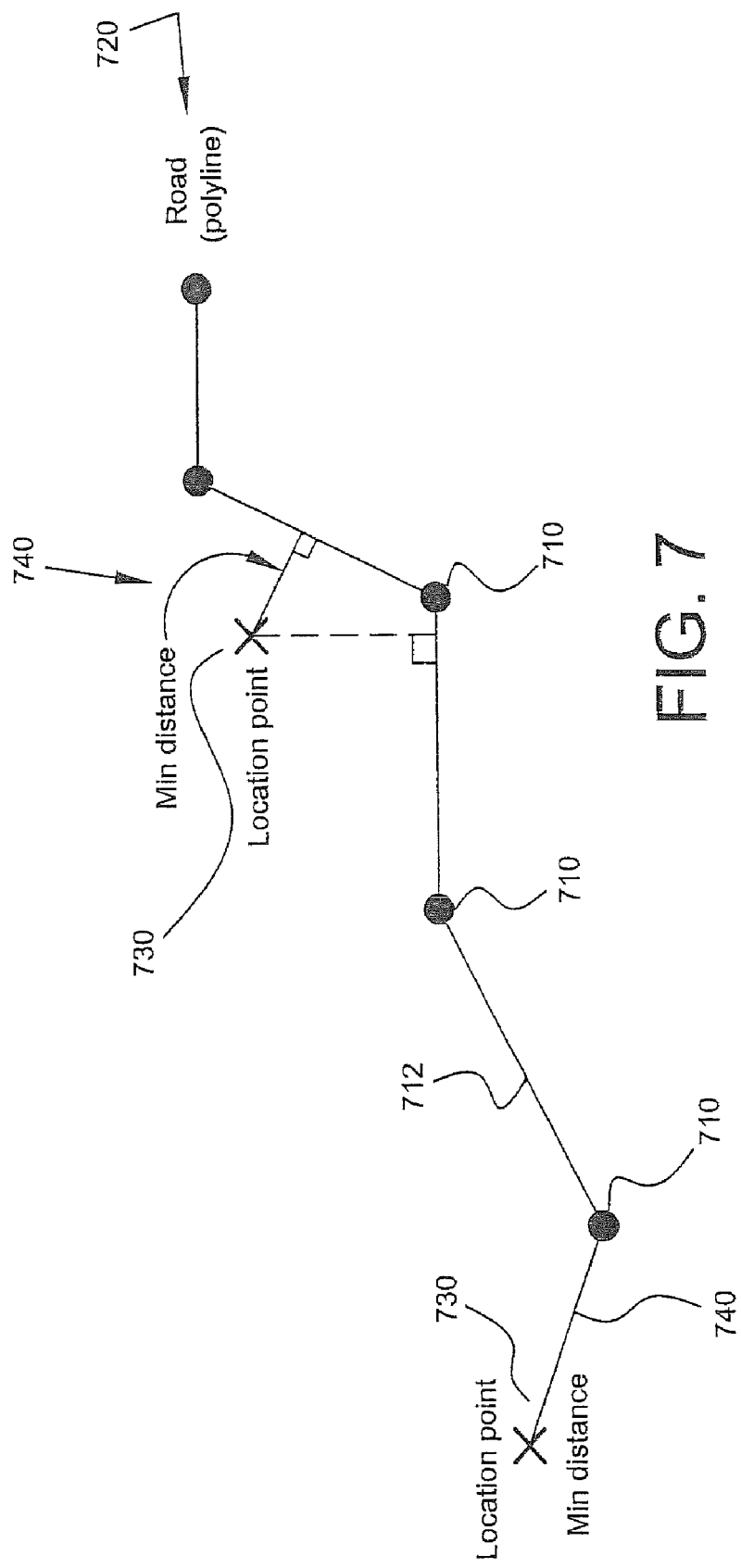
FIG. 7 is an illustration of the distance between fixes and a road according to an embodiment of the present subject matter.

The location estimator unit 230 may then compute distance probabilities as represented by block 530 using the inputs of continuous location blocks 512 and the corresponding road network and transition matrix 522 as inputs. An exemplary probability computation may depend upon the distance of the current fix and the probabilities of the roads for the previous fixes. FIG. 7 is an illustration of the distance between fixes and a road according to an embodiment of the present subject matter. With reference to FIG. 7, a road may be generally defined by a set of latitudes and longitudes (i.e., nodes). A road may also be assumed to be substantially straight between two consecutive nodes 710. Therefore, connecting consecutive nodes 710 with straight lines 712 creates a polyline 720 representing a road. The distance between a point (i.e., fix) 730 and a polyline (i.e., road) 720 may be defined as the minimum distance 740 of all the distances from this point to all the lines in the polyline 720. The distance from a point to a line is the distance of projection if the projection falls onto this line. If the projection fails to fall onto this line then the distance is the minimum distance of the distances to either end of this line.

Utilizing the above relationships, a distance probability function, Pdist( ) may be utilized to return the probability of a fix being on a road given the minimum distance (d) between a fix or point and a candidate road:

$$Pdist(d)=\exp(-d^2/DIST\_DEV^2) \quad (8)$$

where DIST_DEV is the estimated standard deviation of distance error and may be configurable and/or a function of the terrain, other topographical inputs, etc. In one embodiment of the present subject matter, Pdist(d) may be normalized for any one, combination of, or all candidate roads such that the sum of Pdist for all roads is equal to one to represent the probability measure. It is envisioned that other distance probability functions may also be utilized and the function provided in equation (8) should not be construed as limiting the scope of the claims appended herewith. For example, another function may be utilized such as a function inversely proportional to the given distance or the complementary error function of the Gaussian distribution. Distance probability functions employed by embodiments of the present subject matter may also return the probability for one or plural point(s) for a specific road and may or may not include any history of previous fix probabilities. For example, to gain a history of previous GPS points, transition probabilities of the roads may be introduced. Such an exemplary approach can be seen as a state machine with each candidate road representing a discrete state. Transition from one state to another may thus provide a probability depending upon the intersection of roads and the distance of the next point to the intersection.

Figure 8:
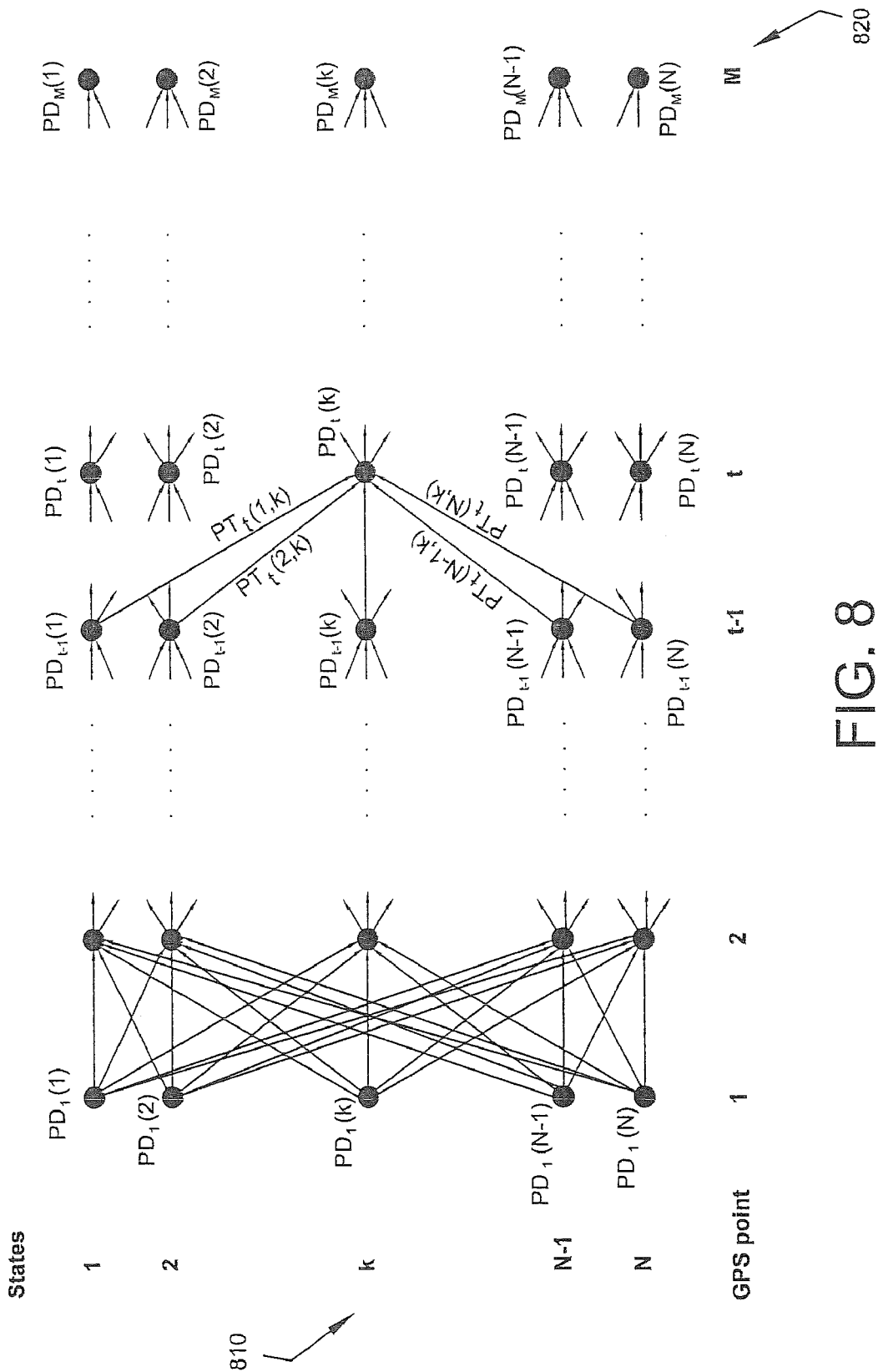
FIG. 8 is a representation of a determination of probabilities according to an embodiment of the present subject matter.

FIG. 8 is a representation of a determination of probabilities according to an embodiment of the present subject matter. With reference to FIG. 8, assuming there are N roads (i.e., states) 810 and M points 820, $PD_t(k)$ may be defined as the distance probability of road k for GPS fix t such that:

$$PD_t(k)=Pdist(d(t,k)) \quad (9)$$

where d(t,k) is the distance between $t^{th}$ point and $k^{th}$ road.

$PT_t(m,k)$ may also be defined as the transition probability of moving from road m to road k for the $t^{th}$ fix. This representation illustrates the likelihood of moving from one road to another given the distance from the fix to the intersection point of these two roads. Because this probability depends upon the location of the current fix, the probability may be determined for each fix. Of course, there are many different methods to compute this transition probability. For example, one method may determine intersections having non-zero values in the transition matrix T and then determine any intersections within a given distance (i.e., MAX_DIST) and assign equal probabilities to these intersections. Intersections having a distance greater than MAX_DIST may be assigned a zero transition probability. Yet another method to determine the transition probability may utilize a function such as Pdist (d) where d is the distance between a point and an intersection point of two roads if a non-zero value exists in the transition matrix T for these two roads. If a probability function is utilized then transition probabilities may be normalized so that the total is one. Thus, the probability that a point is on a specified road may be a function of the current distance probabilities $PD_t$, the previous points' distance probabilities $PD_{t-1}$, and/or the transitions of fixes.

It follows that the probability of a fix at time t being on a road k considering only distance, may be represented as:

$$\text{Proad\_d}(k, t) = PD_t(k)\left(\sum_{j=1}^{N} PD_{t-1}(j)PT_t(j,k)\right) \quad (10)$$

where $1 \leq t \leq M$, $1 \leq k \leq N$ and where Proad_d is an N×M matrix holding probabilities of each candidate road for each fix.

Figure 9:
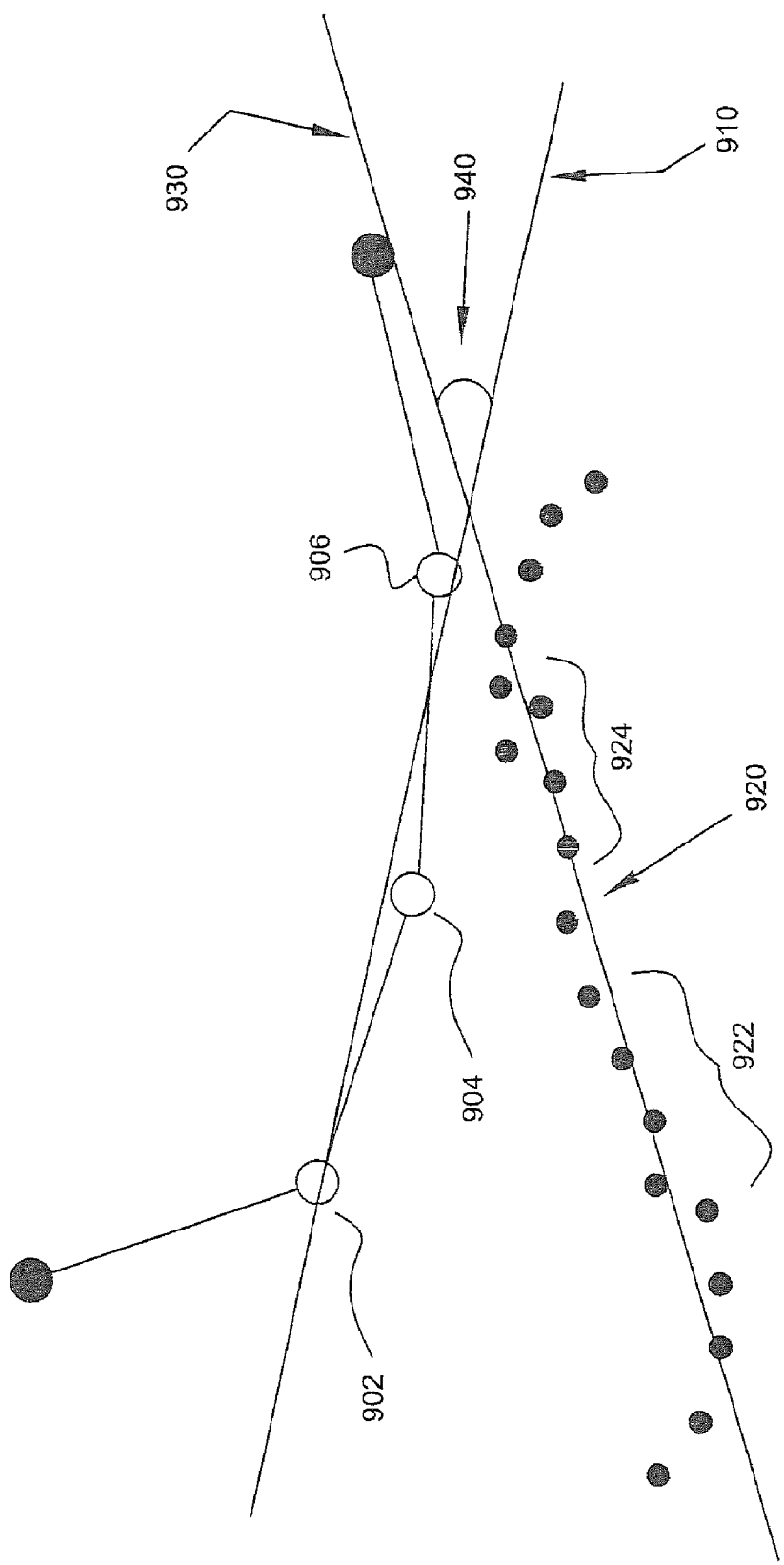
FIG. 9 is an illustration of the determination of an angle between a road and selected points according to an embodiment of the present subject matter.

The location estimator unit 230 may also determine angle probabilities as represented by block 540 using the inputs of continuous location blocks 512 and candidate roads 532 as inputs. The road estimator unit may determine the probabilities of a point being on a road based upon the direction of the road and the direction of travel. FIG. 9 is an illustration of the determination of an angle between a road and selected points according to an embodiment of the present subject matter. With reference to FIG. 9, to determine the direction of the road and the direction of travel, the x-axis may be selected as a reference; however, in additional embodiments, other references may also be selected. To determine the direction of a road for a given point, any number of algorithms may be utilized and the following discussion should not be construed as limiting the scope of the claims appended herewith. In one embodiment of the present subject matter, a value, e.g., NUM_NODES, may be defined as the number of nodes (e.g., latitude, longitude pairs converted to x-y coordinates) utilized to determine the angle of a road. With reference to FIG. 9, NUM_NODES is equal to three. Generally, a minimum value for NUM_NODES may be two, and a maximum value generally depends upon the number of nodes a road has and the curvature thereof. For a given point, the closest NUM_NODES nodes 902, 904, 906 may then be determined. A best-fit line 910 that models these nodes 902, 904, 906 in a least-squares analysis may then be determined, and the angle between the best-fit line 910 and the reference, in this case x-axis, may be determined. The angle may also be adjusted as a function of terrain, topographical constrains, permissible direction of travel, etc. For example, if the road provides only one-way traffic, then the angle may be adjusted as necessary by adding an appropriate angle. This determined angle, road_angle, is representative of the direction of a road.

In one embodiment of the present subject matter, to determine the direction of travel for a given point the parameter NUM_PTS_BEFORE may be defined as the number of points 922 before a current point 920 utilized to determine the direction of travel, and the parameter NUM_PTS_AFTER may be defined as the number of points 924 after the current point 920 utilized to determine the direction of travel. NUM_PTS_BEFORE points 922 before the current point 920 and NUM_PTS_AFTER points 924 after the current point 920 may be a default value or may be selected as a function of the terrain, environment, etc. Therefore, (NUM_PTS_BEFORE+NUM_PTS_AFTER+1) points may be utilized as a set to determine the angle of direction. Of course, these points are also latitude, longitude pairs converted to x-y coordinates. If the number of points before 922 is less than a predetermined number or threshold, then either the number of points before 922 is utilized and/or the number of points after 924 is increased such that the total number of GPS points (NUM_PTS_BEFORE+NUM_PTS_AFTER+1) equals or exceeds the predetermined number or threshold. This predetermined number or threshold may be a function of terrain, topographical constrains, permissible direction of travel, etc. A similar rule may also be applied when the number of points after the current point is less than the required number. After determining the set of location points, a best-fit line 930 that models this set of points in a least-squares analysis may then be determined, and the angle, dir_angle, between this best-fit line 930 and the reference, in this case x-axis, may be determined. The difference between road_angle and dir_angle is given by the following relationship:

$$\mathit{diff}\_\text{angle}=\text{abs}(\text{road}\_\text{angle}-\mathit{dir}\_\text{angle}) \quad (11)$$

where diff_angle 940 represents a measure of how parallel the road and the direction of travel are. Diff_angle 940 may also be utilized to determine how likely these location points correspond to a selected road by the following relationship:

$$P\text{angle}(\text{angle})=\exp(-\text{angle}^2/\text{ANGLE}\_DEV^2) \quad (12)$$

where ANGLE_DEV is an estimated standard deviation of the angle between a road and the direction of travel and where diff_angle is generally equivalent to angle. ANGLE_DEV is configurable and may be a function of terrain, topographical constrains, permissible direction of travel, etc.

For each road and location point, diff_angle 940 and Pangle may be determined. In one embodiment of the present subject matter, the computation time for roads having a zero probability in Proad_d of equation (10) may be reduced by omitting and setting to zero the Pangle determination. Pangle may also be saved or stored in an N×M matrix, e.g., Proad_a, for each road and each location point in any database, an appropriate processor or other storage means.

In block 550, the location estimator unit 230 may then determine joint probabilities as a function of the determined angle probabilities and determined distance probabilities for each road and each location point. In one embodiment of the present subject matter, since distance and angle may be assumed to be independent random variables joint probability may be a multiplication of the distance probabilities and angle probabilities. Joint probabilities may also be saved in matrix form, e.g., Proad_j. In one embodiment, Proad_j may be an element-by-element multiplication of Proad_d and Proad_a and is given by the relationship:

$$\text{Proad}\_j(i,j)=\text{Proad}\_d(i,j)*\text{Proad}\_a(i,j) \quad (13)$$

where $1 \leq j \leq M$, $1 \leq i \leq N$ and where Proad_j is an N×M matrix holding probabilities of each candidate road for each GPS fix.

In block 560, the location estimator unit 230 may then determine the most likely roads for the location points (e.g., GPS points) given the joint probability matrix, Proad_j, determined in equation (13). As discussed above, Proad_j may be an N×M matrix where each column holds joint probabilities of all roads for a specific location point. Representing the $k^{th}$ column of Proad_j as Proad_j(:,k), Proad_j(:,k) is representative of a vector having size N×1. Each row of matrix Proad_j may thus represent a road. It follows that the $m^{th}$ row of matrix Proad_j holds the probabilities of the road having a road ID m for applicable location points. Road IDs for the most likely road of each location point may be found utilizing the following relationship:

$$\text{Most}\_\text{Likely}\_\text{Road}\_\text{IDs}(k)=\text{argmax}(\text{Proad}\_j(:,k)) \quad (14)$$

where $1 \leq j \leq M$ and where argmax( ) provides an index of the maximum element of a vector. Therefore, Most_Likely_Road_IDs 562 provides a vector size of 1×M holding the road IDs of the most likely roads for each location point.

It is thus an aspect of an embodiment of the present subject matter to determine the actual location of a mobile device using an erroneous location computed by a location receiver given that the mobile device is on a road at any given time. It is also an aspect of an embodiment of the present subject matter to utilize current and past erroneous location coordinates, their respective time stamps, other location information such as number of visible satellites, number of communicating network elements, HDOP, and/or GPS mode along with road network data to determine the actual location of a mobile device.

Embodiments of the present subject matter may conduct one or plural iterations of any one, combination or all of the algorithms and relationships defined and described above. Thus, it is therefore an aspect of embodiments of the present subject matter to account for errors in GPS or other positional data that may be a function of location, time, environment, dead reckoning device error, and the like.

Embodiments of the present subject matter may also utilize a priori information or data to reduce any error in positional data, fixes, etc. One useful piece of data that may be utilized by a calibrating device is that the device is on a road. Of course, many other a priori data may be utilized and such an example should not be construed as limiting the scope of the claims appended herewith.

There are an infinite number of approaches in which a set of points in a 2-D area may be mapped to a set of lines. Therefore, in general, there is no unique solution to the problem, nor is there an approach to distinguish between a "good" solution or a "worse" solution without recourse to a set of assumptions, such as, but not limited to, that location or positioning error may be a function of the actual location, time, environment, dead reckoning device error, and the like, and that location error may be a slowly varying function of distance, when distance is along linear segments of roads and/or the error may exhibit sudden changes at intersections. For example, if one were to provide a simplistic assumption that an error is a fixed 2-D shift for an entire region, then a prospective solution would determine the shift minimizing the least squared distance sum between the original points and the assigned points.

Therefore, one embodiment of the present subject matter may provide a calibration device driving a particular road segment twice within a time T where time T is sufficiently small such that an associated error is identical at each location on that road. Considering the assumptions enumerated above, one assumption that may fail to support such an example is the dead reckoning component. Therefore, to augment the measurements taken by an exemplary calibration device, one may re-drive this road segment starting from a particular fixed location where the dead reckoning system is in a known state. For example, a user may energize the associated device, e.g., starting up a vehicle, etc., in the same place within this time T before conducting successive drives through the road segment. It then follows that the associated device and/or calibration system may take the erroneous set of points for the two drive sets and generate two identical curves.

In another embodiment, the previous constraint on time T may be relaxed. This may be achieved by using the time-stamps (contained within the positioning data) to suitably adjust the positioning information. For example, this form of adjustment may compensate for the current spatial location and direction of motion of a particular satellite. By way of another example, the time-stamps may be used to adjust for known changes in network elements that provide other positioning information to the device. Through such modification to positioning information, one may appropriately compare positioning information obtained at distinct times that are not subject to the previous constraints on the time T.

Considering now a similar pair of drive segments where an exemplary device travels from an initializing location (to offset a dead reckoning error) along a road segment and then turns right (or left) at a particular intersection and where an exemplary device travels from the same initializing location along the same road segment but then travels straight through the intersection. Utilizing the embodiments of the present subject matter described above, the sets of points for these two drive sets may be identical from the initialization point through the intersection, and at the intersection the two curves will diverge. This point of divergence uniquely maps to the intersection. In an alternative embodiment of the present subject matter, the divergence (or convergence) may be viewed directly in the positioning information, where such positioning information is modified to accommodate the time of receipt of such information. Thus the positional information available to the location receiver can be mapped without ambiguity to an exact intersection on the available road network.

Therefore, embodiments of the present subject matter may obtain definite, error free mapping of a point in a calibration set to an actual point on the road by determining the point of divergence between two curves obtained as described above. This divergence point then maps unambiguously to the intersection and may also be further refined by knowledge of details of that intersection. Further refinement or improvement to a calibration set may be applied as a function of the terrain, topographical data, permissible direction of travel, permissible turns from a road, etc.

One embodiment of this error free mapping is to employ a progressive or evolutionary refinement of an existing navigation system. Such a navigation system maps a vector of positional information to a geographical location. A processor records the sequence of location estimates on each segment of use of the location receiver. The sequences of such possibly erroneous routes generated by the navigation system, where corresponding positional data vectors are associated with fixes, form maps that should ideally exactly overlay the available road network. As the location receiver traverses routes in the user region over time, multiple such maps, termed route estimates, become available to the processor.

Considering the route estimates over two particular uses of the system, and in particular where the two uses occur from the same initialization (such as, for example, starting from a given user's physical home address) these routes may share common segments with identical positional data. At points where this positional data (possibly time adjusted using available time-stamps) diverges, it may be recognized that the actual traversed route must also diverge. Hence, such points may be mapped to intersections on the road network.

By such means of repetitively acquiring and storing positional information and the associated estimated locations, the processor may, over time build a highly accurate mapping of intersections, given that the intersection is traversed in a different manner in two or more instances. Thus, one embodiment of the present subject matter provides a progressive refinement of an existing navigation system, where multiple instances of estimated routes and associated positional data are examined for common segments and divergences. In addition to divergences, the data may also examined for convergences, both of which may indicate a node or an intersection point in the road network, and provide an error free mapping of the positional data at that point to the intersection location.

With reference to FIG. 2, the post-filtering unit 240 of the navigational unit 200 according to one embodiment of the present subject matter may filter discrepancies occurring in the Most_Likely_Road_IDs 562. For example, portions of positional data or actual location points may match an incorrect road rather than a correct road. Further, road IDs may change from one road ID to another road ID where no turns are possible. Thus, to prevent these and other discrepancies, the post-filtering unit 240 may comprise a plurality of filters and any one filter or combination thereof may be utilized in filtering the Most_Likely_Road_IDs 562. Further, any one or combination of filters may be switched on or off either by the system based upon default values, predetermined thresholds, terrain or other topographical inputs or by a user of a respective apparatus or system employing an embodiment of the present subject matter.

One exemplary filter in the post-filtering unit 240 according to an embodiment of the present subject matter may filter Most_Likely_Road_IDs 562 as a function of minimum time and/or minimum location points. For example, it may be possible that a number of location points are closer to an adjacent road rather than the road on which the mobile device is located or traveling. It follows that the direction of travel for these location points and the associated angle of the adjacent road may also be closer than the road upon which the mobile device is located or traveling. In this instance, some of these location points may be mapped to the adjacent road rather than the correct road. Therefore, an exemplary filter may require that Most_Likely_Road_IDs 562 satisfy a minimum travel time requirement or threshold on a road. The minimum travel time constraint may also be implemented as a minimum number of location points required on a road. Thus, if the minimum travel time (or number of points) is less than a predetermined threshold, the road IDs for the adjacent road may be set to the correct road ID.

Another exemplary filter in the post-filtering unit 240 according to an embodiment of the present subject matter may determine temporary changes in road IDs. This may be encountered when a mobile device makes a U-turn on a road and returns to a previous or another road. Further, such an instance may also be encountered at an intersection of two or more roads where angles and distances for two roads are close enough to result in an incorrect road ID. In these cases the road ID will change to another road ID and then return to the previous or correct road ID as demonstrated by the following relationship:

$$\text{If road ID previous=ROAD\_1 AND road ID} \\ \text{current=ROAD 2 AND road ID next=ROAD 1} \\ \text{then set road ID current=ROAD 1.} \quad (15)$$

Yet another exemplary filter in the post-filtering unit 240 according to an embodiment of the present subject matter may filter impossible transitions in road IDs. For example, when a transition from a first road to a second road is not possible, a third road intersecting with the first and second roads that is close enough to the respective location points may result in an impossible transition. In this instance, an exemplary filter may analyze the first and second roads and determine an average probability for these two roads. Therefore, the road ID of the road having a lower average probability will be shifted to the road ID having the higher probability:

If road ID current=ROAD 1 AND road ID
next=ROAD 2 AND T(ROAD_1,ROAD_2)=0
then determine average probability for both
ROAD_1 and ROAD_2 and set the road IDs of
the lower probability to the road ID of the higher
probability. (16)

A further exemplary filter in the post-filtering unit 240 according to an embodiment of the present subject matter may filter location points having a probability less that a predetermined number or threshold. For example, if the joint probability of the maximum likely road is less than a threshold value, MIN_J_PROB, then the respective location points may be discarded. Such an instance may occur when positional data provided by a location receiver possesses large errors resulting in location fixes having a large distance from any candidate road. This may also occur when new roads are added to a region and the respective road network database has not been updated. In another embodiment, the filter may simply flag the fix or location point as invalid for further analysis rather than discarding the data.

Figure 10:
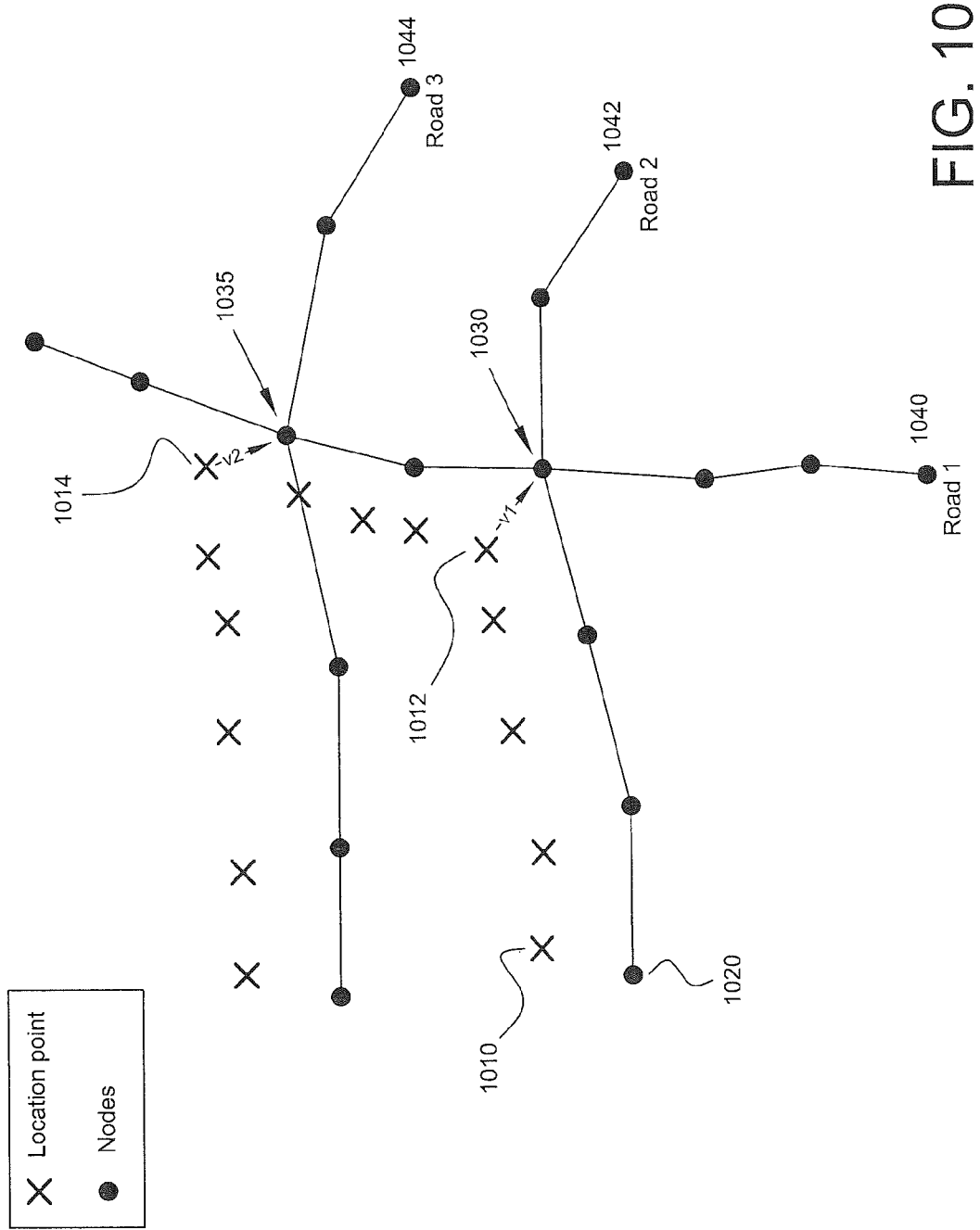
FIG. 10 is an illustration of a detected shift in location points according to one embodiment of the present subject matter.
Figure 11:
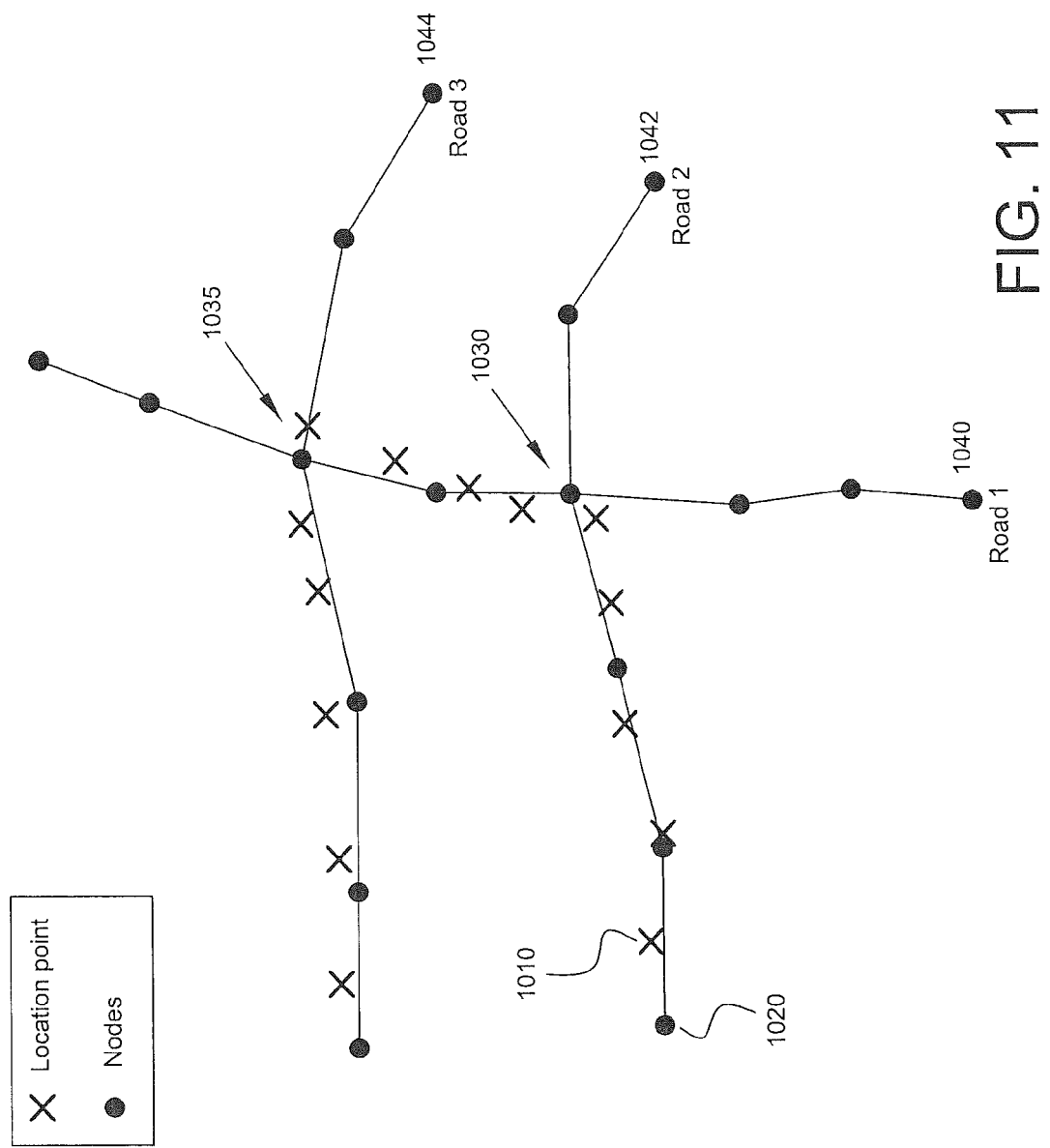
FIG. 11 is an illustration of the corrected GPS points of FIG. 10.

The post-filtering unit 240 of the navigational unit 200 according to one embodiment of the present subject matter may accept the most likely roads identified for each location point and correct the point to ensure that the point is displayed or associated with a correct road. Embodiments of the present subject matter employing the post-filtering unit 240 may correct location points by any number of methods, and two approaches are presented below; however, such a disclosure should not be construed as limiting the scope of the claims appended herewith. FIG. 10 is an illustration of a detected shift in location points according to one embodiment of the present subject matter. With reference to FIG. 10, a post filtering unit 240 may detect if points 1010 have been shifted from nodes 1020 globally or locally. This may be accomplished by comparing the turns of location points to the respective road network. In the example shown in FIG. 10, a global shift was detected as well as a first turn 1030 and a second turn 1035. Correction vectors v1, v2 may then be defined from the location points 1012, 1014 corresponding to the respective turns 1030, 1035 to the actual locations of the turns where the roads 1040, 1042, 1044 intersect. These correction vectors v1, v2 may be applied to all or sets of the location points, and the location points may then be projected onto the appropriate roads as illustrated in FIG. 11. In a further embodiment of the present subject matter, the correction vectors v1, v2 may be utilized independently around a turn. In the case that a detected location shift is local, different location shifts may be encountered at different turns. Therefore, the respective projection of location points onto the appropriate road may be altered by a predetermined factor that reduces the magnitude of the shift vector as the distance from the turn increases.

Figure 12:
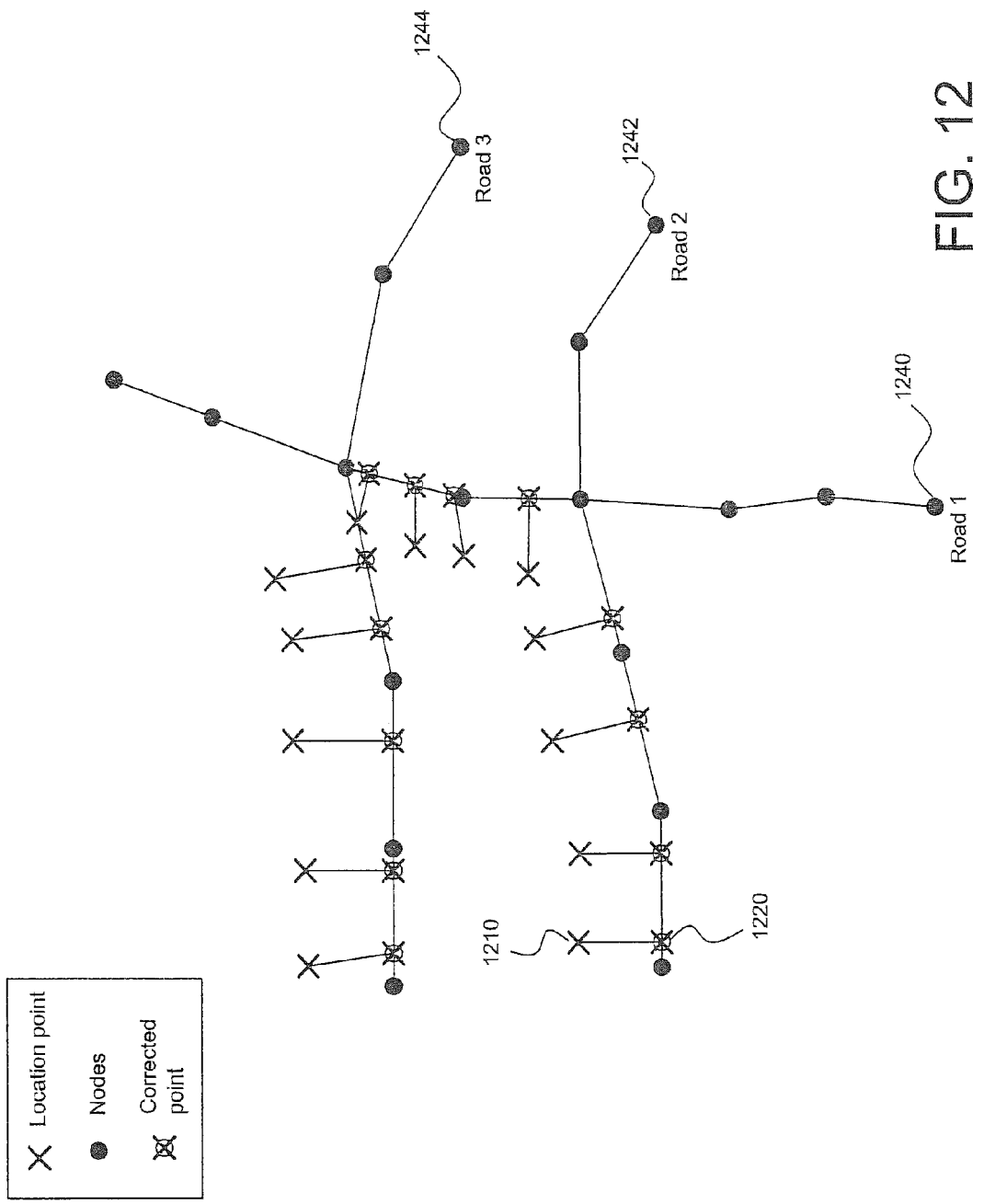
FIG. 12 is an illustration of a detected shift in GPS points according to another embodiment of the present subject matter.

Another embodiment of the post-filtering unit 240 may determine whether a location point is associated with a road. FIG. 12 is an illustration of a detected shift in location points according to another embodiment of the present subject matter. With reference to FIG. 12, a projection from each location point 1210 to the associated road 1240, 1242, 1244 may be determined. Since the road is a polyline, the projection point 1220 that has the closest distance to the respective location point 1210 is selected as the corrected point.

The data mapper unit 250 of the navigational unit 200 generates a set of positional data and associated computed locations that are on the road network. The road network database 220 also provides input to the data mapper unit 250. Each set of positional data is of the form of mapped elements. These mapped elements are composed of a vector V of positional information (V may include a time-stamp) and the related original location estimate, L_orig, as well as the refined (post filtering and analysis) location estimate, L_filt. Thus, the data mapper has a current map of a set of positional information vectors and a related set of original and refined location estimates. The data mapper unit 250 generates groups of such mappings, G, which are presented to the mapping analyzer unit 270.

The mapping analyzer unit 270 examines a given mapping G in relation to the road network database 220 (or position information database, i.e., the actual locations that constrain the user) and all stored data mappings. A data mapping storage unit 260 contains current best estimated mappings and a user-specified number of previous mappings obtained recently. The mapping analyzer unit 270 then examines the mapping G in relation to the road network database 220 and the mapping storage unit 260 to determine segments in G having small variation in terms of their set of vectors V with stored segments. The mapping analyzer unit 270 looks for similarity in segments, focusing on the positional information vectors. Having established regions of similarity, the mapping analyzer unit 270 determines points of divergence or convergence in the positional information vectors. Such points of divergence or convergence may then be associated with intersections in the road network database 220.

Figure 15:
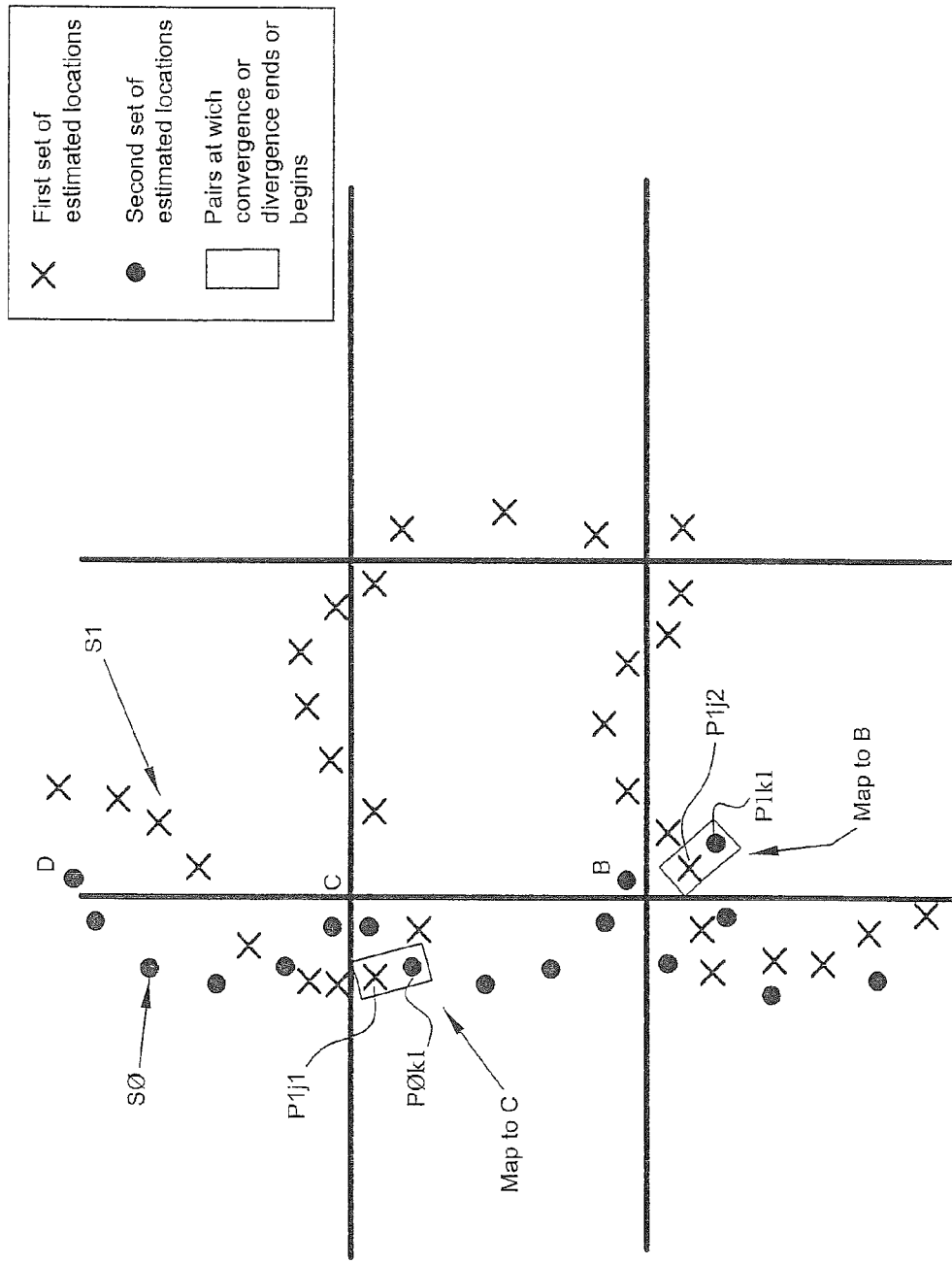
FIG. 15 is an illustration of a first set of estimated locations extracted from stored data mappings and a current set of estimated locations according to one embodiment of the present subject matter.

FIG. 15 is an illustration of a first set of estimated locations S1 extracted from the data mapping storage unit 260, and a second set of estimated locations S0. For the purposes of illustration, it may be assumed that the segments from A to B and C to D show convergence in the positional information. Through examination of the points of divergence, the mapping analyzer unit 270 may determine that the points P0$k$1 and P1$j$1 are the last convergent points in the segments and the points P0$k$2 and P1$j$2 are the first convergent points in the segments. These two pairs of points may be recognized as requiring an association both in terms of positional information and actual location which map to an intersection. Various methods of associating these points with an intersection may be applied. For example, the mapping analyzer unit 270 may select the closest intersection to the original estimated locations of each pair. The mapping analyzer unit 270 may also select the intersection that generates the most probable mapping considering all other points. In another embodiment, the mapping analyzer unit 270 may revisit the work of the pre-filtering unit and post-filtering units with this new information. In yet a further embodiment, the mapping analyzer unit 270 may search for the mapping to intersections that generate the least distortion to the current estimated locations. The mapping analyzer unit 270 may then determine intersections that should be assigned as locations for particular positional information vectors.

The mapping analyzer unit 270, having determined those positional information vectors that should be mapped to particular intersections, suitably adjusts the estimated locations for all adjacent locations and associated positional information so that the resulting positional route corresponds to some segments of the available road network database 220. Such an adjustment may be achieved by multi-dimensional interpolation for example. Points in the set of locations S1 and S0 may then be mapped to segments on the road network database 220 with associated positional information also obtained and relationally stored. Based upon this mapping, the mapping analyzer unit 270 may update the current location estimate 272 determined using the current raw positional information. In addition, the mapping analyzer unit 270 may update the associated navigation system 271 (i.e. the method by which positional information is mapped to location). The new mapping is also passed on to the data mapping storage unit 260, thus implementing an evolutionary aspect of the present subject matter.

Exemplary scenarios may also be naturally present in the obtained positional data, and may be ascertained by examining the associated time stamps on the positional data and the associated sets of available points. This information may also be exploited to improve embodiments of the present subject matter. It is thus an aspect of the present subject matter to provide a set and/or plural sets of calibration points in a standalone navigational device or in a supporting navigational or geolocation device as a part of a telecommunications network to mitigate and reduce geolocation errors in a set or subset of fixes or location points.

Figure 13:
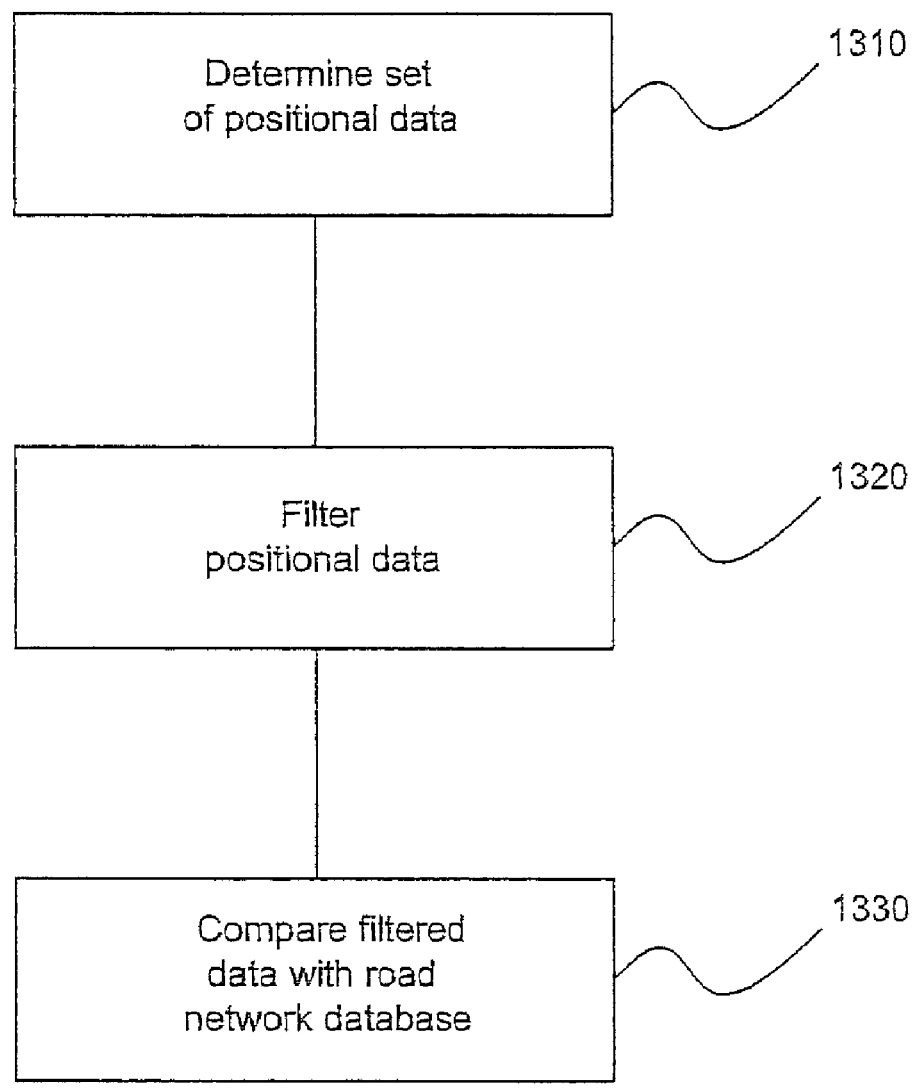
FIG. 13 is an algorithm for estimating a location of a device in a navigation system according to an embodiment of the present subject matter.

FIG. 13 is an algorithm 1300 according to an embodiment of the present subject matter for estimating a location of a device in a navigation system. With reference to FIG. 13, in step 1310, a plurality of locations of a device are determined from a set of positional data from signals received from a plurality of sources. An exemplary device may be a mobile unit such as, but not limited to, a cellular device, text messaging device, computer, portable computer, vehicle locating device, vehicle security device, communication device, wireless transceiver, hand-held navigational device, and a vehicular navigational device. In one embodiment of the present subject matter, the sources may be satellite that are a part of a Global Navigation Satellite System ("GNSS") such as, but not limited to, GPS, Galileo, GLONASS, and QZSS. In step 1320, the positional data may then be filtered. The filtered positional data may be compared with data from a road network database in step 1330. The comparison may be a function of a distance from at least one point defined by a set of the filtered positional data to a road in said road network database, and an angle between a line representing a best fit for plural points defined by corresponding plural sets of said filtered positional data to a line defined by a road in said road network database. Exemplary data in the road network database may be map-related information such as, but is not limited to, latitudes and longitudes of roads, permissible direction of travel on a road, speed limits, allowable turns from a road, curvature of a road, and topographical data.

In one embodiment of the present subject matter, the estimated location may be determined as a function of a joint probability of distance of the device to a road and an angle between the road and the direction of travel of the device. In another embodiment of the present subject matter, the estimated location may be determined as a function of the most likely position for all positioning measurements. In yet another embodiment of the present subject matter, the estimated location may be determined as a function of the quality of the positioning measurements.

Figure 14:
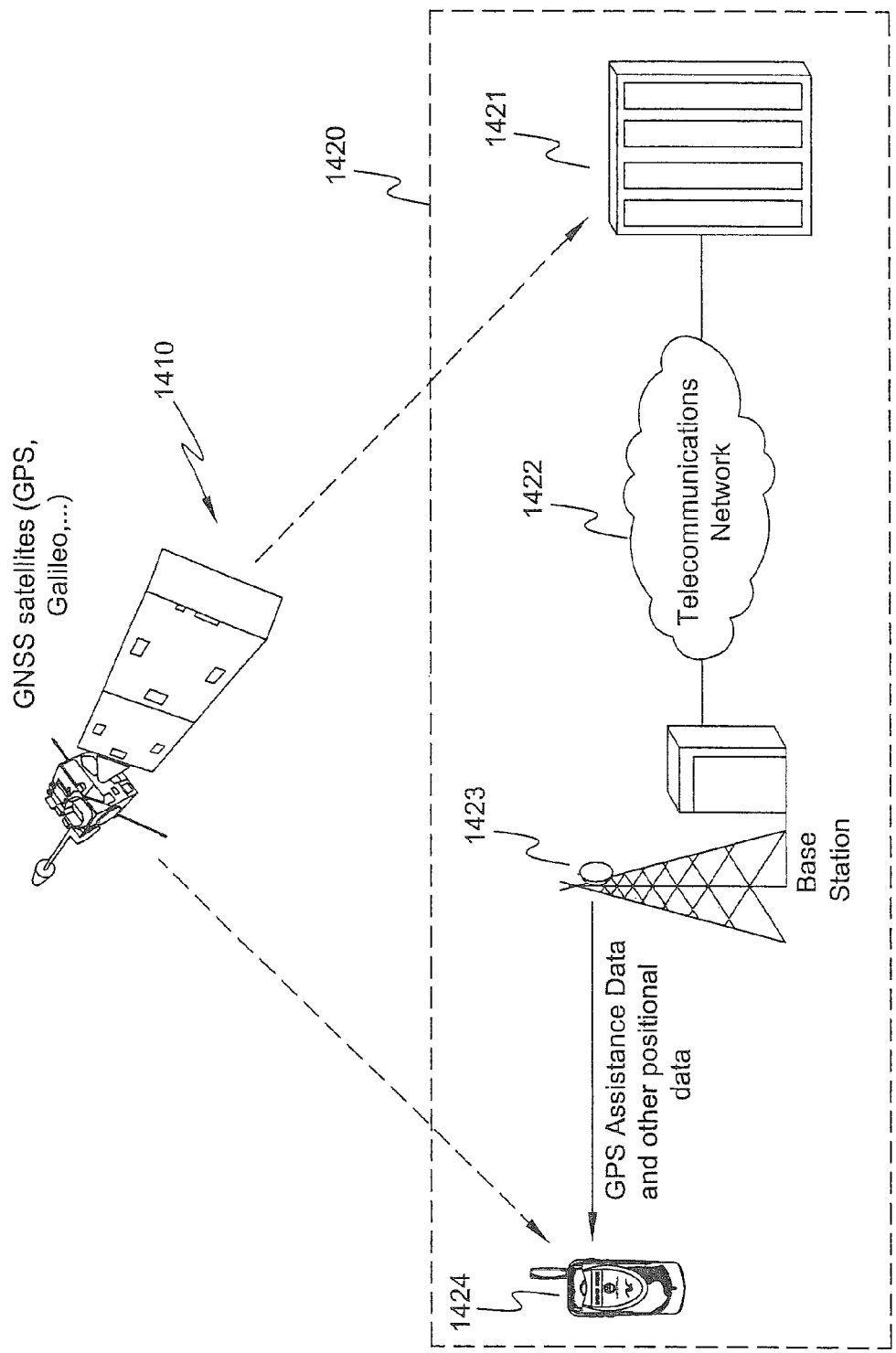
FIG. 14 is a schematic representation for implementing one embodiment of the present subject matter.

FIG. 14 is a schematic representation for implementing one embodiment of the present subject matter. With reference to FIG. 14, a satellite system 1410 may communicate with a ground system 1420. The ground system 1420 may include a cellular network having a location center 1421. The location center 1421 may be a Mobile Location Center (MLC) configured to communicate with a telecommunication network 1422 and one or plural base stations 1423, LMUs, etc. In one embodiment of the present subject matter, a device 1424 communicates with the base station 1423 to acquire GPS assistance data and other positional data (e.g., TA, RTT, TDOA, AOA, NMR, etc.). The location center 1421 may communicate a preliminary estimate of the device's location on the basis of the device's cell site. This information may then be relayed to the device and used for location determination. The location center 1421 may also receive satellite information from a GPS satellite and other positioning information available from the network. The satellite information may include the satellite's broadcast ephemeris information of the broadcasting satellite or that of all satellites. The location center 1421 may relay the information back to the device 1424 or use the information, either singularly or along with some preliminary estimation of the device's location, to assist the device in a geographic location determination.

An apparatus according to one embodiment of the present subject matter may include a device comprising a receiver for receiving signals from a plurality of sources and circuitry for determining for each of a plurality of locations of the device a set of positional data from the received signals. Exemplary sources may be satellites, base stations, other network elements, and/or any combination thereof. The satellites may be part of a GNSS such as, but not limited to, GPS, Galileo, GLONASS, and QZSS. Exemplary devices may be a cellular device, text messaging device, computer, portable computer, vehicle locating device, vehicle security device, communication device, wireless transceiver, hand-held navigational device, and a vehicular navigational device.

The device may also include a filter for filtering the positional data and circuitry for comparing the filtered positional data with data from a road network database to provide as estimated location of the device. In one embodiment of the present subject matter, the circuitry for comparing may comprise circuitry for identifying positional data having a time of data less than a predetermined threshold, circuitry for reducing candidate roads for the estimated location as a function of a predetermined distance from the identified positional data, circuitry for computing distance probabilities as a function of the identified positional data and reduced candidate roads, and circuitry for computing angle probabilities as a function of identified positional data being on a candidate road based upon the direction of the road and direction of travel of the device.

The comparison may be a function of a distance from at least one point defined by a set of the filtered positional data to a road in the road network database and an angle between a line representing a best fit for plural points defined by corresponding plural sets of the filtered positional data to a line defined by a road in the road network database. Of course, the positional data may be both current and/or past positional data of the device. Exemplary positional data may be any one or combination of latitude, longitude, time of data, number of visible positional satellites, HDOP, altitude, and positional mode information. In one embodiment the road network database may include map-related information such as, but not limited to, latitudes and longitudes, permissible direction of travel on a road, speed limits, allowable turns from a road, curvature of a road, topographical data, other information or data that may define, constrain, and be related to or associated with a road, as well as other information or data that may not be associated with or related to a road.

Embodiments of the present subject matter may be employed a stand-alone navigation system or may be employed as a sub-system of another system such the telecommunications network 1422. Exemplary networks or systems utilizing embodiments of the present subject matter may be, but are not limited to a Universal Mobile Telecommunications System ("UMTS") network, Worldwide Interoperability for Microwave Access ("WiMax") network, Global System for Mobile Communications ("GSM") network, WiFi network, Code Division Multiple Access ("CDMA") network or any system operating under a standard such as IS-95, Evolution-Data Optimized ("EDVO"), CDMA2000, and 1 times Radio Transmission Technology ("1xRTT"). It is envisioned that embodiments of the present subject matter may thus provide a current location of a mobile device or vehicle in real time and/or may also be part of a non-real time system requiring accurate GPS positions, points or fixes for any purpose.

As shown by the various configurations and embodiments illustrated in FIGS. 1-15, a method and apparatus for determining the geographic location of a device have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A method of estimating a location of a device, comprising:
   (a) determining by a first processor for each of a plurality of locations of said device a set of positional data from signals received from a plurality of sources;
   (b) filtering said positional data; and
   (c) comparing by a second processor said filtered positional data with data from a road network database wherein said comparing is a function of:
      (i) a distance from at least one point defined by a set of said filtered positional data to a road in said road network database, and
      (ii) an angle between a line representing a best fit for plural points defined by corresponding plural sets of said filtered positional data to a line defined by a road in said road network database.

2. The method of claim 1 wherein the step of filtering said positional data further comprises discarding positional data as a function of satellite visibility.

3. The method of claim 1 wherein the step of filtering said positional data further comprises discarding positional data as a function of the visibility of a network element in a communications network.

4. The method of claim 1 wherein the step of filtering said positional data further comprises discarding positional data if the respective Horizontal Dilution of Precision ("HDOP") is greater than a predetermined threshold.

5. The method of claim 1 wherein the step of filtering said positional data further comprises discarding dead-reckoning based data if the estimated location differs from an actual location by more than a predetermined threshold.

6. The method of claim 1 wherein the step of filtering said positional data further comprises the step of detecting a jump between consecutive positional data if the speed between the consecutive positional data exceeds a predetermined threshold.

7. The method of claim 6 further comprising the step of correcting the jump as a function of the angle and the speed between the consecutive positional data.

8. The method of claim 1 wherein said positional data comprises both current and past positional data of said device.

9. The method of claim 1 wherein said positional data is selected from the group consisting of latitude, longitude, time of data, number of visible positional satellites, HDOP, altitude, and positional mode information.

10. The method of claim 1 wherein said road network database comprises map-related information is selected from the group consisting of latitudes and longitudes of roads, permissible directional travel on a road, speed limits, allowable turns from a road, curvature of a road, and topographical data.

11. The method of claim 1 further comprising the step of filtering the compared data as a function of topographical information.

12. The method of claim 1 further comprising the step of correcting the compared data by projecting an estimated location on a predetermined road.

13. The method of claim 1 further comprising the step of correcting the compared data as a function of topographical information.

14. The method of claim 1 wherein the step of comparing further comprises the steps of:
   (i) identifying positional data having a time of data less than a predetermined threshold;
   (ii) reducing candidate roads for an estimated location as a function of a predetermined distance from said identified positional data;
   (iii) computing distance probabilities as a function of the identified positional data and reduced candidate roads; and
   (iv) computing angle probabilities as a function of identified positional data being on a candidate road based upon the direction of the road and the direction of travel of the device.

15. The method of claim 14 wherein a distance probability is a function of the following relationship:

$$P\text{dist}(d) = \exp(-d^2/\text{DIST\_DEV}^2)$$

wherein DIST_DEV is an estimated standard deviation of distance error.

16. The method of claim 15 wherein an angle probability is a function of the following relationship:

$$P\text{angle}(\text{angle}) = \exp(-\text{angle}^2/\text{ANGLE\_DEV}^2)$$

wherein ANGLE_DEV is an estimated standard deviation of angle error.

17. The method of claim 15 wherein the step of computing distance probabilities further comprises computing distance probabilities for N candidate roads and M identified positional data as a function of the following relationship:

$$\text{Proad\_d}(k, t) = PD_t(k)\left(\sum_{j=1}^{N} PD_{t-1}(j)PT_t(j, k)\right)$$

where $1 \leq t \leq M$, $1 \leq k \leq N$ and where Proad_d is an N×M matrix holding probabilities of each candidate road for each positional data.

18. The method of claim 1 wherein at least one of said plurality of sources is a satellite which is a part of a Global Navigation Satellite System ("GNSS").

19. The method of claim 18 wherein the GNSS is selected from the group consisting of: Global Positioning System ("GPS"), Galileo, GLONASS, and Quasi-Zenith Satellite System ("QZSS").

20. The method of claim 1 wherein the device is a mobile unit.

21. The method of claim 20 wherein the mobile unit is selected from the group consisting of: cellular device, text messaging device, computer, portable computer, vehicle locating device, vehicle security device, communication device, wireless transceiver, hand-held navigational device, vehicular navigational device.

22. A device comprising:
(a) a receiver for receiving signals from a plurality of sources;
(b) circuitry for determining for each of a plurality of locations of said device a set of positional data from said received signals;
(c) a filter for filtering said positional data; and
(d) circuitry for comparing said filtered positional data with data from a road network database to provide an estimated location of said device, said comparing being a function of:
   (i) a distance from at least one point defined by a set of said filtered positional data to a road in said road network database, and
   (ii) an angle between a line representing a best fit for plural points defined by corresponding plural sets of said filtered positional data to a line defined by a road in said road network database.

23. The device of claim 22 wherein said positional data comprises both current and past positional data of said device.

24. The device of claim 22 wherein said positional data is selected from the group consisting of latitude, longitude, time of data, number of visible positional satellites, HDOP, altitude, and positional mode information.

25. The device of claim 22 wherein said road network database comprises map-related information is selected from the group consisting of: latitudes and longitudes of roads, permissible direction of travel on a road, speed limits, allowable turns from a road, curvature of a road, and topographical data.

26. The device of claim 22 wherein the circuitry for comparing further comprises:
   (i) circuitry for identifying positional data having a time of data less than a predetermined threshold;
   (ii) circuitry for reducing candidate roads for the estimated location as a function of a predetermined distance from said identified positional data;
   (iii) circuitry for computing distance probabilities as a function of the identified positional data and reduced candidate roads; and
   (iv) circuitry for computing angle probabilities as a function of identified positional data being on a candidate road based upon the direction of the road and direction of travel of the device.

27. The device of claim 22 wherein at least one of said plurality of sources is a satellite that is a part of a Global Navigation Satellite System ("GNSS").

28. The device of claim 27 wherein the GNSS is selected from the group consisting of: Global Positioning System ("GPS"), Galileo, GLONASS, and Quasi-Zenith Satellite System ("QZSS").

29. The device of claim 22 wherein the device is selected from the group consisting of: cellular device, text messaging device, computer, portable computer, vehicle locating device, vehicle security device, communication device, wireless transceiver, hand-held navigational device, vehicular navigational device.

30. A system for estimating the location of a mobile station that receives signals from a plurality of sources, comprising:
(a) a receiver for receiving signals from a plurality of transmission sources;
(b) circuitry for determining for each of a plurality of locations of mobile station a set of positional data from said received signals;
(c) a filter for filtering said positional data; and
(d) circuitry for comparing said filtered positional data with data from a road network database to provide an estimated location of said mobile station, said comparing being a function of:
   (i) a distance from at least one point defined by a set of said filtered positional data to a road in said road network database, and
   (ii) an angle between a line representing a best fit for plural points defined by corresponding plural sets of said filtered positional data to a line defined by a road in said road network database.

31. The system of claim 30 wherein at least one of said plural sources is a satellite.

32. The system of claim 31 where the satellite is a part of a Global Navigation Satellite System ("GNSS").

33. The system of claim 32 wherein the GNSS is selected from the group consisting of: Global Positioning System ("GPS"), Galileo, GLONASS, and Quasi-Zenith Satellite System ("QZSS").

34. The system of claim 30 wherein at least one of said plural sources is a base station.

35. The system of claim 30 wherein the mobile station is selected from the group consisting of: cellular device, text messaging device, computer, portable computer, vehicle locating device, vehicle security device, communication device, wireless transceiver, hand-held navigational device, vehicular navigational device.

36. The system of claim 30 wherein said system is selected from the group consisting of: Universal Mobile Telecommunications System ("UMTS") network, Worldwide Interoperability for Microwave Access ("WiMax") network, Global System for Mobile Communications ("GSM") network, WiFi network, Code Division Multiple Access ("CDMA") network.

37. The system of claim 36 wherein said system operates under a standard selected from the group consisting of: IS-95, Evolution-Data Optimized ("EDVO"), CDMA2000, and 1 times Radio Transmission Technology ("1xRTT").

38. The method of claim 1 wherein the first and second processors are the same.

* * * * *